(12) United States Patent
Berman et al.

(10) Patent No.: US 11,290,334 B2
(45) Date of Patent: Mar. 29, 2022

(54) DETERMINING CAUSE OF SUB-OPTIMAL NETWORK DEVICE PERFORMANCE

(71) Applicant: Cisco Technology, Inc., San Jose, CA (US)

(72) Inventors: Adam L. Berman, San Francisco, CA (US); Nathaniel Brahms, San Francisco, CA (US); Brian A. Tobin, Oakland, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/414,134

(22) Filed: May 16, 2019

(65) Prior Publication Data

US 2020/0177459 A1 Jun. 4, 2020

Related U.S. Application Data

(60) Provisional application No. 62/774,566, filed on Dec. 3, 2018.

(51) Int. Cl.

| | |
|---|---|
| *H04L 12/24* | (2006.01) |
| *H04L 12/28* | (2006.01) |
| *H04L 29/08* | (2006.01) |
| *H04L 12/26* | (2006.01) |
| *H04L 41/0893* | (2022.01) |

(Continued)

(52) U.S. Cl.
CPC ...... *H04L 41/0893* (2013.01); *H04L 12/2854* (2013.01); *H04L 43/12* (2013.01); *H04L 67/18* (2013.01)

(58) Field of Classification Search
CPC . H04L 41/0893; H04L 12/2854; H04L 43/12; H04L 67/18
See application file for complete search history.

(56) References Cited

U.S. PATENT DOCUMENTS

| | | | |
|---|---|---|---|
| 7,231,182 B2 * | 6/2007 | Katz | ..................... H04W 24/04 379/1.01 |
| 7,698,377 B2 | 4/2010 | Parekh et al. | |
| 9,094,309 B2 | 7/2015 | Branch et al. | |

(Continued)

OTHER PUBLICATIONS

Anant Shah et al., "Disco: Fast, Good, and Cheap Outage Detection", TMA Conference 2017, Jun. 21, 2017, 9 pages.

(Continued)

*Primary Examiner* — William G Trost, IV
*Assistant Examiner* — Monishwar Mohan
(74) *Attorney, Agent, or Firm* — Edell, Shapiro & Finnan, LLC

(57) ABSTRACT

In one example, a server classifies a subnetwork of network devices as performing sub-optimally. The server also classifies a geographic cluster of network devices as performing sub-optimally. The server determines whether a particular sub-optimally performing network device is in both the subnetwork and the geographic cluster. If it is determined that the particular sub-optimally performing network device is in both the subnetwork and the geographic cluster, the server identifies the particular sub-optimally performing network device as performing sub-optimally due to a performance issue with a Wide Area Network to which the particular sub-optimally performing network device belongs.

20 Claims, 17 Drawing Sheets

(51) Int. Cl.
*H04L 67/52* (2022.01)
*H04L 43/12* (2022.01)

(56) References Cited

U.S. PATENT DOCUMENTS

| | | | |
|---|---|---|---|
| 9,838,279 B2 | 12/2017 | Ogielski et al. | |
| 9,942,253 B2 | 4/2018 | Freedman et al. | |
| 10,292,036 B1* | 5/2019 | Robinson | H04W 4/021 |
| 2005/0234922 A1* | 10/2005 | Parekh | G06F 16/29 |
| 2011/0153801 A1* | 6/2011 | Ji | H04L 63/1416 |
| | | | 709/224 |
| 2013/0246606 A1* | 9/2013 | Branch | H04L 41/0853 |
| | | | 709/224 |
| 2015/0094111 A1* | 4/2015 | Kim | H04W 4/08 |
| | | | 455/519 |
| 2017/0208077 A1* | 7/2017 | Freedman | G06F 16/2471 |
| 2017/0257290 A1* | 9/2017 | Ogielski | H04L 45/00 |
| 2017/0316586 A1* | 11/2017 | Ricci | G06T 11/206 |
| 2018/0295588 A1* | 10/2018 | Abdelmonem | H04J 11/0023 |

OTHER PUBLICATIONS

Aceto, G. et al., "A Comprehensive Survey on Internet Outages", Mar. 27, 2018, 47 pages.
Downdetector, "About US", https://downdetector.com/about-us/, Nov. 19, 2018, 4 pages.
Philipp Richter et al., "Advancing the Art of Internet Edge Outage Detection", 2018 Internet Measurement Conference (IMC '18), Oct. 31, 2018, 14 pages.
Center for Applied Internet Data Analysis, "Internet Outage Detection and Analysis (IODA)", http://www.caida.org/projects/ioda/, Oct. 2, 2018, 6 pages.
Wikipedia, "MTR (software)", Feb. 16, 2018, 4 pages.
Lin Quan et al., "Trinocular: Understanding Internet Reliability Through Adaptive Probing", Sigcomm'13, Aug. 12, 2013, 12 pages.
Monkeybrains, "Support—Monkeybrains ISP!", https://www.monkeybrains.net/support.php, Feb. 13, 2017, 4 pages.
ThousandEyes, "Internet Outage Detection", https://marketo-web.thousandeyes.com/rs/thousandeyes/images/ThousandEyes_Data_Sheet_Internet_Outage_Detection.pdf, Jan. 8, 2018, 2 pages.
MLab, "What is Measurement Lab", https://www.measurementlab.net/about/, Nov. 10, 2018, 3 pages.
Y. Rekhter et al., "A Border Gateway Protocol 4 (BGP-4)", Network Working Group, Request for Comments: 1771, Obsoletes: 1654, Category: Standards Track, Mar. 1995, 57 pages.
Information Sciences Institute, "Transmission Control Protocol", DARPA Internet Program Protocol Specification, RFC: 793, Sep. 1981, 89 pages.
J. Postel, "User Datagram Protocol", RFC 768, Aug. 28, 1980, 3 pages.
J. Postel, "Internet Control Message Protocol", DARPA Internet Program Protocol Specification, Network Working Group, Request for Comments: 792, Sep. 1981, 21 pages.
Information Sciences Institute, "Internet Protocol", DARPA Internet Program Protocol Specification, RFC: 791, Sep. 1981, 49 pages.

* cited by examiner

DETERMINING CAUSE OF SUB-OPTIMAL NETWORK DEVICE PERFORMANCE

CROSS REFERENCE TO RELATED APPLICATION

This application claims the benefit of U.S. Provisional Application No. 62/774,566, filed Dec. 3, 2018, the entirety of which is incorporated herein by reference.

TECHNICAL FIELD

The present disclosure relates to resolving network connectivity issues.

BACKGROUND

More than ever before, systems rely on persistent connections to the Internet. However, Internet access can be unreliable or perform poorly for a number of reasons: edge routers can fail, devices can be misconfigured, Autonomous Systems (ASs) can make poor routing choices, etc. Such unreliable Internet access can cause problems for large swathes of users, enterprises, etc.

DESCRIPTION OF EXAMPLE EMBODIMENTS

Overview

In one example embodiment, a server classifies a subnetwork of network devices as performing sub-optimally. The server also classifies a geographic cluster of network devices as performing sub-optimally. The server determines whether a particular sub-optimally performing network device is in both the subnetwork and the geographic cluster. If it is determined that the particular sub-optimally performing network device is in both the subnetwork and the geographic cluster, the server identifies the particular sub-optimally performing network device as performing sub-optimally due to a performance issue with a Wide Area Network to which the particular sub-optimally performing network device belongs.

EXAMPLE EMBODIMENTS

Figure 1:
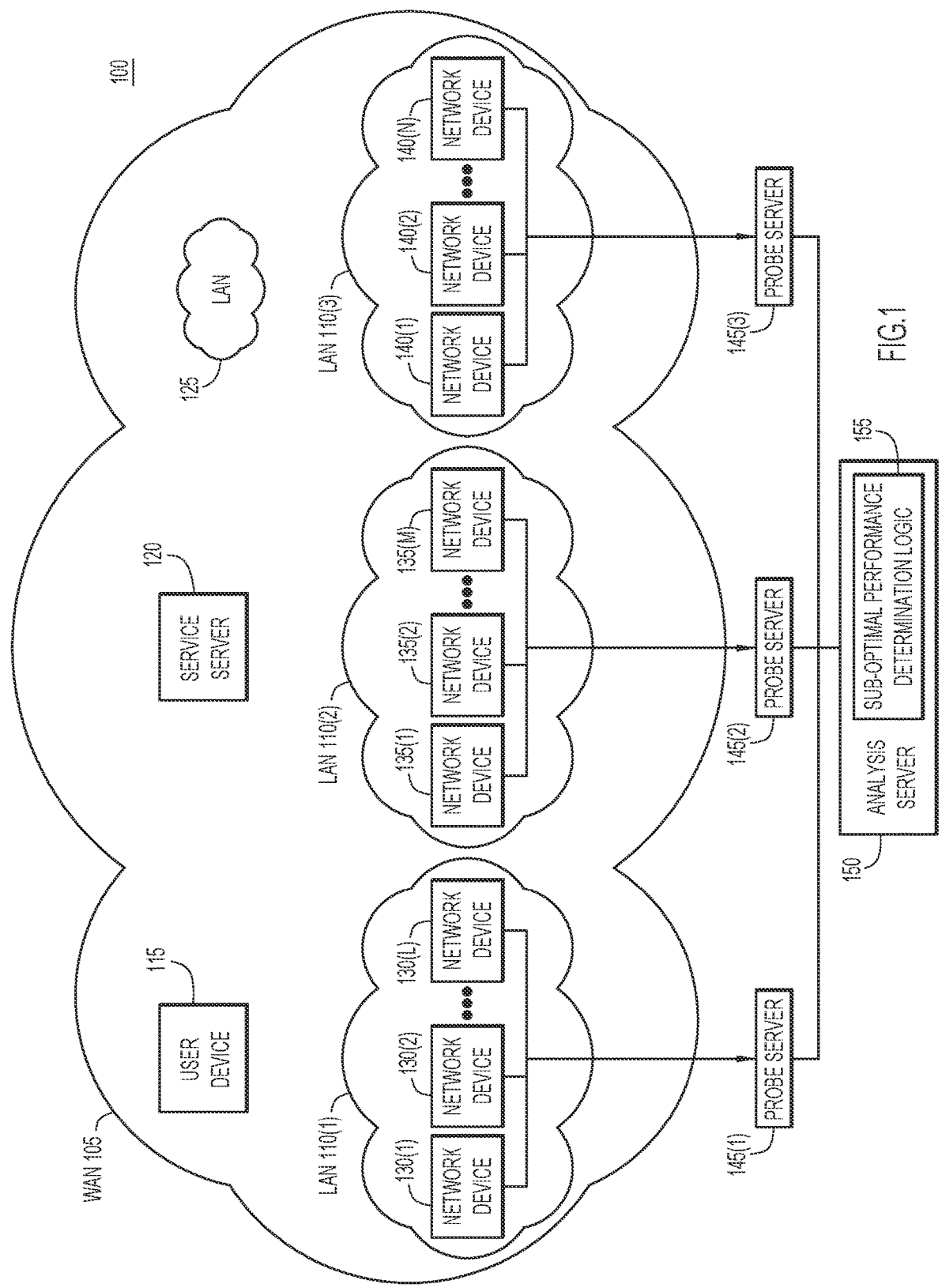
FIG. 1 illustrates a system for determining a cause of sub-optimal network device performance, according to an example embodiment.

FIG. 1 illustrates an example system 100 for determining the cause of a sub-optimally performing network device. System 100 includes Wide Area Network (WAN) 105 (e.g., the Internet). WAN 105 includes Local Area Networks (LANs) 110(1)-110(3), user device 115, service server 120, and LAN 125. LANs 110(1)-110(3) may service respective enterprises, buildings, outdoor areas, etc. WAN 105 is configured to enable LANs 110(1)-110(3) to communicate with user device 115, service server 120, and/or LAN 125.

LAN 110(1) includes network devices 130(1)-130(L), LAN 110(2) includes network devices 135(1)-135(M), and LAN 110(3) includes network devices 140(1)-140(N). Network devices 130(1)-130(L), 135(1)-135(M), and 140(1)-140(N) may be wireless Access Points (APs), switches, routers, etc. Network devices 130(1)-130(L) may be configured to provide Internet connectivity for LAN 110(1); network devices 135(1)-135(M) may be configured to provide Internet connectivity for LAN 110(2); and network devices 140(1)-140(N) may be configured to provide Internet connectivity to LAN 110(3). In one specific example, network devices 130(1)-130(L) may be configured to carry network traffic (e.g., packets) between LAN 110(1) and user device 115; network devices 135(1)-135(M) may be configured to carry network traffic between LAN 110(2) and service server 120; and network devices 140(1)-140(N) may be configured to carry network traffic between LAN 110(3) and LAN 125.

System 100 may further include probe servers 145(1)-145(3) configured to communicate and coordinate with analysis server 150. Probe servers 145(1)-145(3) may comprise a distributed backend of servers each located in a different data center. Probe server 145(1) is configured to communicate with network devices 130(1)-130(L), probe server 145(2) is configured to communicate with network devices 135(1)-135(M), and probe server 145(3) is configured to communicate with network devices 140(1)-140(N). In one example, network devices 130(1)-130(L) use probe server 145(1) as a primary server, probe server 145(2) as a backup server in case probe server 145(1) becomes unreachable (e.g., probe server 145(1) or connections thereto fail), and probe server 145(3) as a tertiary server in case probe servers 145(1) and 145(2) become unreachable. Network devices 135(1)-135(M) and 140(1)-140(N) may similarly have backup and/or tertiary servers. Thus, network devices 130(1)-130(L), 135(1)-135(M), and 140(1)-140(N) have redundancies for connecting to analysis server 150. Network devices 130(1)-130(L), 135(1)-135(M), and 140(1)-140(N) may connect to probe servers 145(1)-145(3) via any suitable protocol/mechanism (e.g., tunneling protocol, HyperText Transfer Protocol Secure (HTTPS), etc.).

Network devices 130(1)-130(L), 135(1)-135(M), and 140(1)-140(N) may belong to one or more subnetworks. A subnetwork is a set of Internet Protocol (IP) addresses that are typically owned by a common Autonomous System (AS), which is in turn managed by an Internet Service Provider (ISP). A single ISP may be responsible for the operation of one or more ASs. Each network device 130(1)-130(L), 135(1)-135(M), and 140(1)-140(N) (and/or each uplink of network devices 130(1)-130(L), 135(1)-135(M), and 140(1)-140(N)) may have an IP address associated therewith. Thus, for example, a first plurality of network devices 130(1)-130(L) may belong to a first subnetwork managed by a first ISP, and a second plurality of network devices 130(1)-130(L) belong to a second subnetwork managed by a second ISP. In another example, network devices 130(1)-130(L) and network devices 135(1)-135(M) belong to a single subnetwork managed by a single ISP.

Network devices 130(1)-130(L), 135(1)-135(M), and 140(1)-140(N) may be geographically distributed in any particular manner. In one specific example, LANs 110(1) and 110(2) may be located near each other, and LAN 110(3) may be located remote from LANs 110(1) and 110(2). It will be appreciated that the techniques described herein may be implemented with any suitable geographic and/or subnetwork arrangement.

End users often experience disruptions in connectivity because one or more network devices perform sub-optimally (e.g., go offline). For example, LAN 110(1) may experience a disruption in connectivity with user device 115. However, the network administrator of LAN 110(1) may have difficulty determining whether the disruption is caused by a performance issue on WAN 105 or a performance issue unrelated to WAN 105. This is because the network administrator is typically limited only to data from LAN 110(1), and does not have access to data regarding WAN 105 at large. For example, if LAN 110(1) is servicing a building, the network administrator may be unable to determine whether the disruption in connectivity with user device 115 is caused by a geographical Internet outage caused by the weather (performance issue with the WAN 105) wiring in the building (performance issue with entity other than WAN 105). Alternatively, if LAN 110(1) is servicing an enterprise, the network administrator may be unable to determine whether the disruption in connectivity with user device 115 is caused by poor routing choices made by an AS (performance issue with WAN 105) or a switch misconfiguration or edge router failure (performance issue with entity other than WAN 105).

This is a systemic problem for many entities that use the Internet. Conventional approaches focus on IP address geolocation, which involves determining whether there is a geographical Internet outage that could be causing the disruption. However, this approach is highly inaccurate, and as such IP address geolocation provides low-granularity results (e.g., on a country-wide level). Some conventional approaches try to avoid this issue by assuming that network devices in the same subnetwork are in the same geographical region, but this assumption is often baseless. For example, a first IP address in a subnetwork may have a physical location in a first geographic region (e.g., Atlanta, Ga.), and a second IP address in the subnetwork may have a physical location in a second geographic region remote from the first geographical region (e.g., San Francisco, Calif.). As such, conventional approaches fail to determine with adequate reliability whether a disruption is caused by a performance issue on a LAN or a performance issue on the Internet.

Accordingly, analysis server 150 is provided with sub-optimal performance determination logic 155 that is configured/designed to determine whether a disruption is caused by a local (e.g., cabling problem, configuration issue, etc.) or global (e.g., WAN 105) performance issue. Briefly, analysis server 150 may obtain data from network devices 130(1)-130(L) via probe server 145(1), from network devices 135(1)-135(M) via probe server 145(2), and from network devices 140(1)-140(N) via probe server 145(3). Based on the data, sub-optimal performance determination logic 155 causes analysis server to determine the cause of the network connectivity disruption. A network administrator (e.g., of LAN 110(1)) may use this information to quickly resolve any disruption in network connectivity (e.g., with user device 115). For example, if analysis server 150 determines that the performance issue is a broader problem with WAN 105, the network administrator may work with the appropriate ISP to resolve the performance issue. Alternatively, if analysis server 150 determines that the performance issue is local, the network administrator may focus on correcting the local performance issue.

In one example, analysis server 150 may classify a subnetwork of network devices (e.g., one or more of network devices 130(1)-130(L)) as performing sub-optimally (e.g., as being partially or fully offline, having high latency, etc.). Analysis server 150 may further classify a geographic cluster of network devices (e.g., one or more of network devices 130(1)-130(L)) as performing sub-optimally. Analysis server 150 may determine whether a particular sub-optimally performing network device (e.g., network device 130(1)) is in both the subnetwork and the geographic cluster. If it is determined that the particular network device is in both the subnetwork and the geographic cluster, analysis server 150 may identify the particular sub-optimally performing network device as performing sub-optimally due to a performance issue with a WAN to which the particular sub-optimally performing network device belongs (e.g., WAN 105). If it is determined that the particular sub-optimally performing network device is not in both the subnetwork and the geographic cluster, analysis server 150 may identify the particular sub-optimally performing network device as not performing sub-optimally due to the performance issue with WAN 105.

Cross-correlating the offline information of the subnetwork and the offline information of the geographic cluster decreases uncertainty as to why the particular network device is offline. There may be an inherent uncertainty as to whether every network device in a given subnetwork or geographic cluster is offline because only the offline data for a fraction of the network devices in the subnetwork or geographic cluster is available at any given time. For example, the online/offline status of only 50 or 100 IP addresses out of 255 possible IP addresses may be known at any given time. Overlaying the offline data for both the subnetwork and the geographic cluster improves the degree of confidence of a determination as to why a particular offline network device is offline as a result of a specific ISP in a specific geographic area. Furthermore, unlike IP geo-location, which inherently links geographic location to the IP address, techniques described herein use independent, ground truth location data about each IP address.

Figure 2:
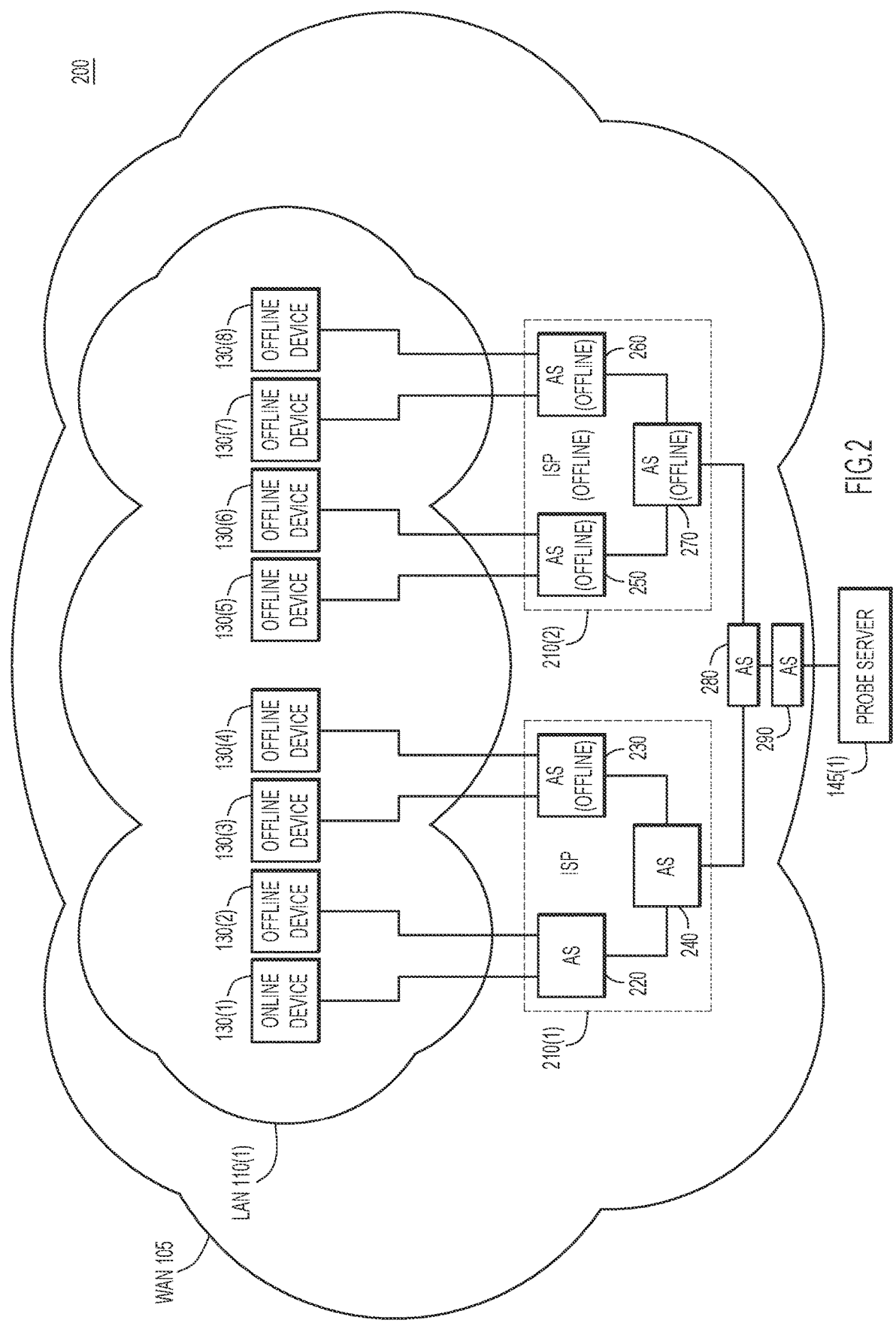
FIG. 2 illustrates a portion of the system of FIG. 1 in more detail, according to an example embodiment.

FIG. 2 illustrates an example portion 200 of system 100 in more detail. Portion 200 illustrates a portion of WAN 105, which includes LAN 110(1), and probe server 145(1). LAN 110(1) includes online network device 130(1) and offline network devices 130(2)-130(8). ISP 210(1) operates network devices 130(1)-130(4) and ISP 210(2) operates network devices 130(5)-130(8). ISP 210(1) is partially offline because at least one network device that it manages is online (network device 130(1)), and at least one network device that it manages is offline (network devices 130(2)-130(4)). ISP 210(2) is fully offline because every network device that it manages is offline (network devices 130(5)-130(8)).

ISP 210(1) manages ASs 220-240. Network devices 130(1) and 130(2) belong to AS 220. Network devices 130(3) and 130(4) belong to AS 230. ASs 220 and 230, in turn, belong to AS 240. Similarly, ISP 210(2) manages ASs 250-270. Network devices 130(5) and 130(6) belong to AS 250. Network devices 130(7) and 130(8) belong to AS 260. ASs 250 and 260 belong to AS 270. ASs 240 and 270 are in communication with AS 280, which is in turn in communication with AS 290. Probe server 145(1) is in communication with AS 290. Network traffic may flow between gateways in different ASs 220-290 as determined by Border Gateway Protocol (BGP).

Figure 3:
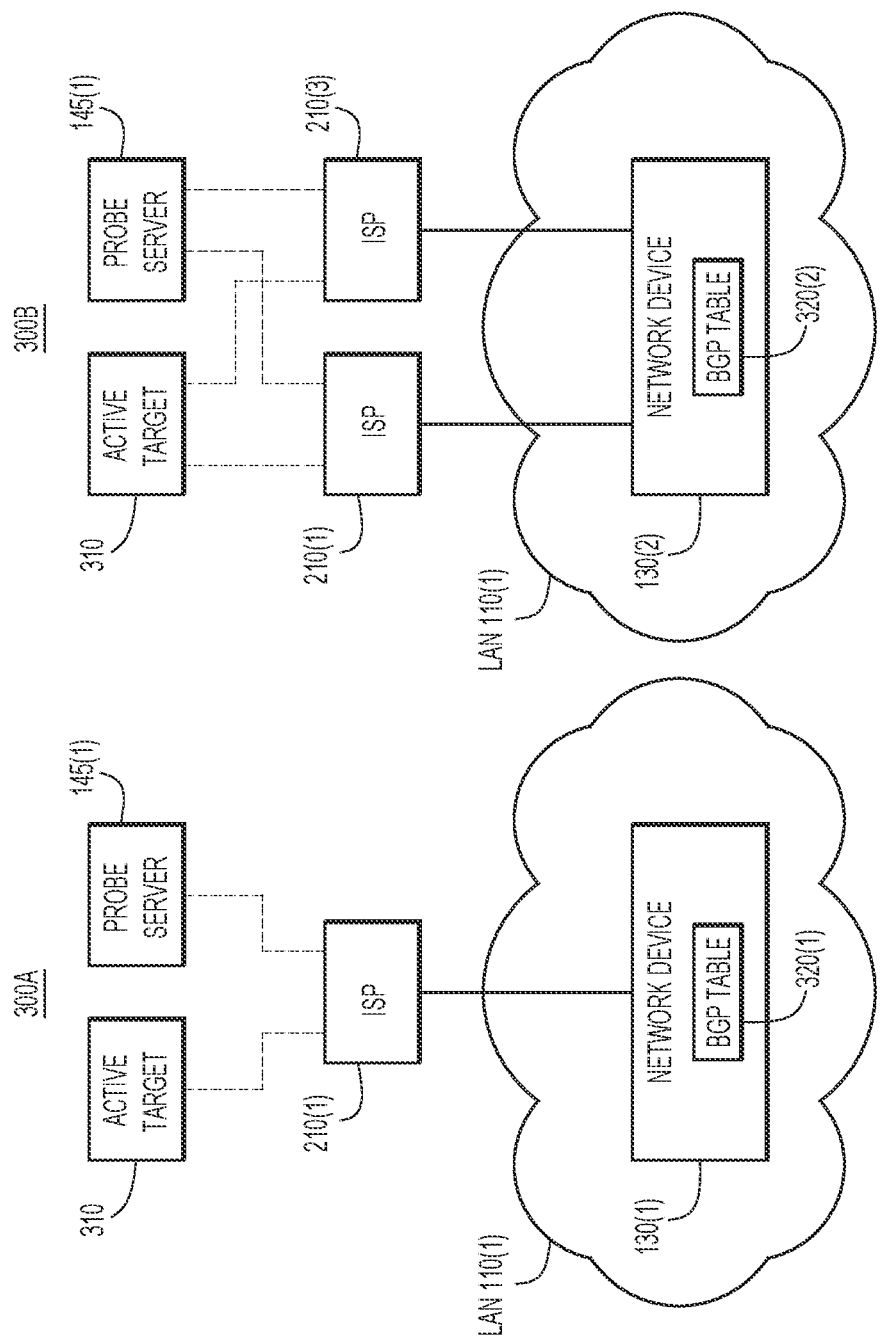
FIGS. 3A and 3B illustrate other respective portions of the system of FIG. 1 in more detail, according to an example embodiment.

FIGS. 3A and 3B illustrate other portions 300A and 300B of system 100 in more detail. Portion 300A includes LAN 110(1), ISP 210(1), active target 310, and probe server 145(1). ISP 210(1) may manage one or more ASs. Active target 310 may be a Domain Name System (DNS) server. As shown, network device 130(1) includes BGP table 320(1). In the example of FIG. 3A, network device 130(1) is connected to a single ISP 210(1). The solid line connecting network device 130(1) and ISP 210(1) indicates a single Internet link between two gateways. The dashed lines between ISP 210(1) and active target 310(1) and between ISP 210(1) and probe server 145(1) indicate a chain of one or more such Internet links.

Portion 300B includes LAN 110(1), ISPs 210(1) and 210(3), active target 310, and probe server 145(1). ISP 210(1) may include one or more ASs. Active target 310 may be a DNS server. As shown, network device 130(2) includes BGP table 320(2). In the example of FIG. 3B, network device 130(2) is connected to two ISPs 210(1) and 210(3).

Figure 4:
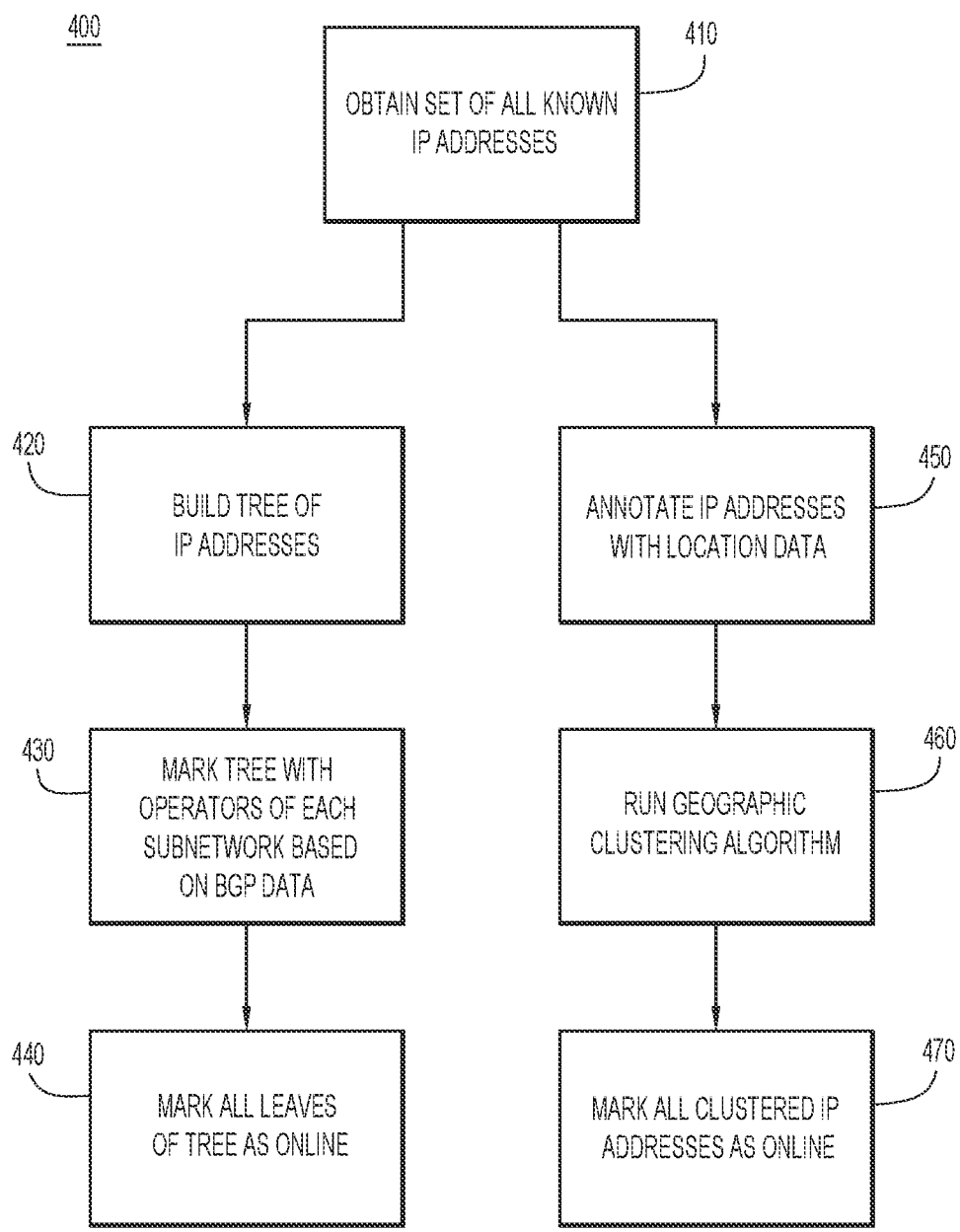
FIG. 4 is a flowchart of a method for constructing initial data structures, according to an example embodiment.

FIG. 4 is a flowchart of an example method 400 for constructing initial data structures. Reference may be made to FIGS. 1, 2, 3A, and 3B for the purposes of describing FIG. 4. Method 400 may be performed by analysis server 150. At 410, analysis server 150 obtains a set of all known IP addresses. The IP addresses may correspond, for example, to network devices 130(1)-130(L), 135(1)-135(M), and 140(1)-140(N) (or to one or more uplinks thereof). The set of IP addresses may be obtained in any suitable manner, such as through automated gathering and/or manual input by a network administrator.

Operations 420-470 may be performed in any acceptable order. For example, operations 420-440 may be performed simultaneously to, before, or after operations 450-470. For the purposes of the description of method 400, operations 420-440 will be described first, followed by operations 450-470. At 420, analysis server 150 builds a tree of IP addresses. An IP address tree is a structure representing how IP addresses are related. For example, the IP address 255.128.7.1 is in human-readable form and includes four octets (i.e., eight-bit integers). In computer-readable (binary) form, this IP address is thirty-two 1's or 0's. The computer-readable form may be represented as part of an IP address tree, with each node of the tree representing an additional binary digit (bit) of the IP address. Thus, each leaf represents a full 32-bit IP address.

At 430, analysis server 150 marks the IP address tree with ASs/ISPs of each subnetwork based on BGP data. A subnetwork is a grouping of IP addresses that may be grouped using the IP address tree. In particular, each parent node of the IP address tree represents a group of IP addresses sharing a common prefix (subnetwork). For example, 128.1.1.0/24 is a prefix representing a subnetwork. This prefix refers to all the IP addresses in the 128.1.1.X block. In other words, the first twenty-four bits must match 128.1.1, but the last eight bits may be any value. /24 is the smallest grouping that can be advertised. BGP data may be added to this tree by iterating through each advertisement in, e.g., BGP tables 320(1) and 320(2), and marking the corresponding subnetwork node with the owner AS of that subnet. For example, analysis server 150 may read information obtained from BGP table 320(1) and mark each node of the IP address tree that represents the logical apex of an advertised subnetwork with the AS of that subnetwork. There may be a known list on the Internet indicating which ISPs own which groupings of IP addresses. At 440, analysis server 150 marks all leaves (e.g., IP addresses) of the IP address tree as online (or having good performance).

At 450, analysis server 150 annotates the IP addresses with location data. The location data may be geographic data of physical network devices (e.g., network devices 130(1)-130(L), 135(1)-135(M), and 140(1)-140(N)) corresponding to the IP addresses. The location data may include, for example, street address, Global Positioning System (GPS) data, latitude/longitude, zip code, city, rural/suburban/urban designation, etc. The location data may be periodically collected (e.g., by triangulation). The location data may also be obtained for network devices that are in a fixed location. At 460, analysis server 150 runs a geographic clustering algorithm to identify geographic clusters of IP addresses. Each IP address may be marked with a geographic cluster designation. Any suitable geographic clustering algorithm may be used. At 470, analysis server 150 marks all clustered IP addresses as online (or having good performance).

Figure 5:
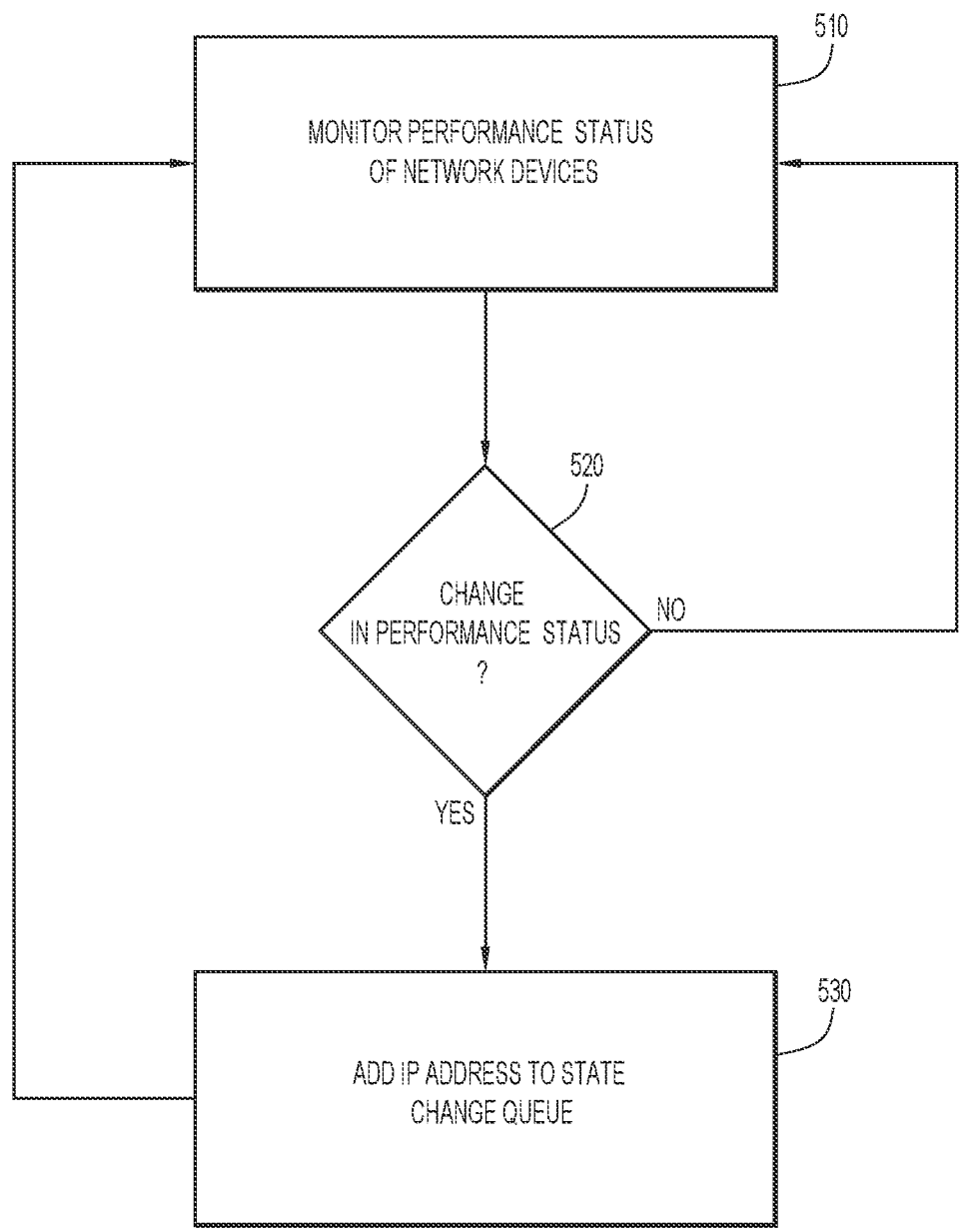
FIG. 5 is a flowchart of a method for obtaining data from network devices, according to an example embodiment.

FIG. 5 is a flowchart of an example method for obtaining input data. Reference may be made to FIG. 1 for the purposes of describing FIG. 5. The input data may be a performance status of network devices (e.g., network devices 130(1)-130(L), 135(1)-135(M), and 140(1)-140(N)), and may be obtained (directly or indirectly) from the network devices. Method 400 may be performed by analysis server 150.

In general, there may be two types of measurements: passive and active. Passive measurement involves observing the behavior of a network without introducing any new packets into the network. In the Internet outage context, passive measurement may involve monitoring for traffic patterns that indicate a network device has started or stopped sending network traffic. The second type of data is active measurement, which involves sending packets into a network for the purpose of measuring the behavior of those packets. In the outage detection context, active measurement usually involves sending packets to Internet edge devices and listening for a response.

In the example of FIG. 5, at 510 analysis server 150 monitors the performance status of the network devices. There may be at least two types of data sources which can be used as input data to determine the performance status of the network devices: beacon data and active measurement data. Beacon data may be obtained from the network devices, acting as beacons, periodically connecting to the backend (e.g., probe servers 145(1)-145(3)). Each network device may send beacons via the Universal Datagram Protocol (UDP) or the Transmission Control Protocol (TCP) to the backend. The period may be a maximum of 45 seconds per communication. Because of the redundancies to the backend (both multiple servers and multiple protocols), it is unlikely that an unreachable device is the fault of the backend. Thus, network device reachability may be a data source for the availability of the primary uplink for that network device.

Active measurement data may be obtained by the network devices periodically sending pings and traceroutes out of all uplinks (e.g., one or more ISP links). The network devices may send active probes via Internet Control Message Protocol (ICMP). For example, pings may be sent to the default DNS server for the network device (e.g., active target 310) once every five seconds. This may result in false positives and false negatives, but may nonetheless serve as a proxy for the Internet. For example, false positives may occur if the DNS server is down when the rest of the Internet is still accessible. Conversely, false negatives may occur if the DNS server is accessible when the rest of the Internet (e.g., beyond the edge of the Internet) is not. Such false positives and negatives notwithstanding, DNS server availability is a fair proxy for the ability of a network device to pass traffic to the Internet, as well as the loss and latency to the Internet edge.

Network devices may use traceroute to the backend in order to provide a detailed view of the route taken by the traffic, as well as to identify the point at which the traffic is dropped or loss or latency is introduced. Traceroute data may provide the topology of the Internet at the edge near network devices. This may enable identification of the portion of the topology that is performing sub-optimally (e.g., offline). Each network device may regularly report the result of its active probes to the backend.

Other types of input data may also be used to increase the accuracy of the output. For example, the loss and latency of each connection from the network device to the backend may also be monitored and recorded. The network devices may also/alternatively perform passive measurements by recording metadata of network traffic that passes through the network devices. Furthermore, Multiprotocol Label Switching (MPLS) or other tunneling mechanisms may be measured. In yet another example, My Trace Route (MTR) may be run continuously to a variety of servers. This may provide more fine-grained and reliable information about the reachability state of a network device.

In addition, using capacity measurement techniques at scale as an active probing measurement tool may enable identification of increases and decreases in Internet capacity over time. Better input data may increase the degree of confidence of cross-correlation and validation of whether and why a given IP address is within a problem area. With a browser integration, a computer's ability to access the Internet may be monitored with both passive and active techniques. This may provide increased visibility into sections of the Internet for which only sparse data is available.

Based on the input data (e.g., beacon and/or active measurement data), at 520, analysis server 150 may determine whether there is a change in the performance status of the network device (e.g., via continuous monitoring of beacon and/or active measurement data). For example, if the input data first indicates that a network device is online, analysis server 150 may determine that there is no change in the performance status of that network device because all network devices are initially indicated as online. In that case, method 500 proceeds back to operation 510. However, if analysis server 150 determines that there is a change in the performance status of the network device (e.g., because the input data first indicates that a network device is offline), method 500 proceeds to operation 530, where analysis server 150 inserts a message into a state change queue indicating that this particular IP address has changed its performance state. In one example, the possible states of an IP address in the state change queue are "good," "poor," or "unavailable." Method 500 then proceeds back to operation 510.

Figure 6:
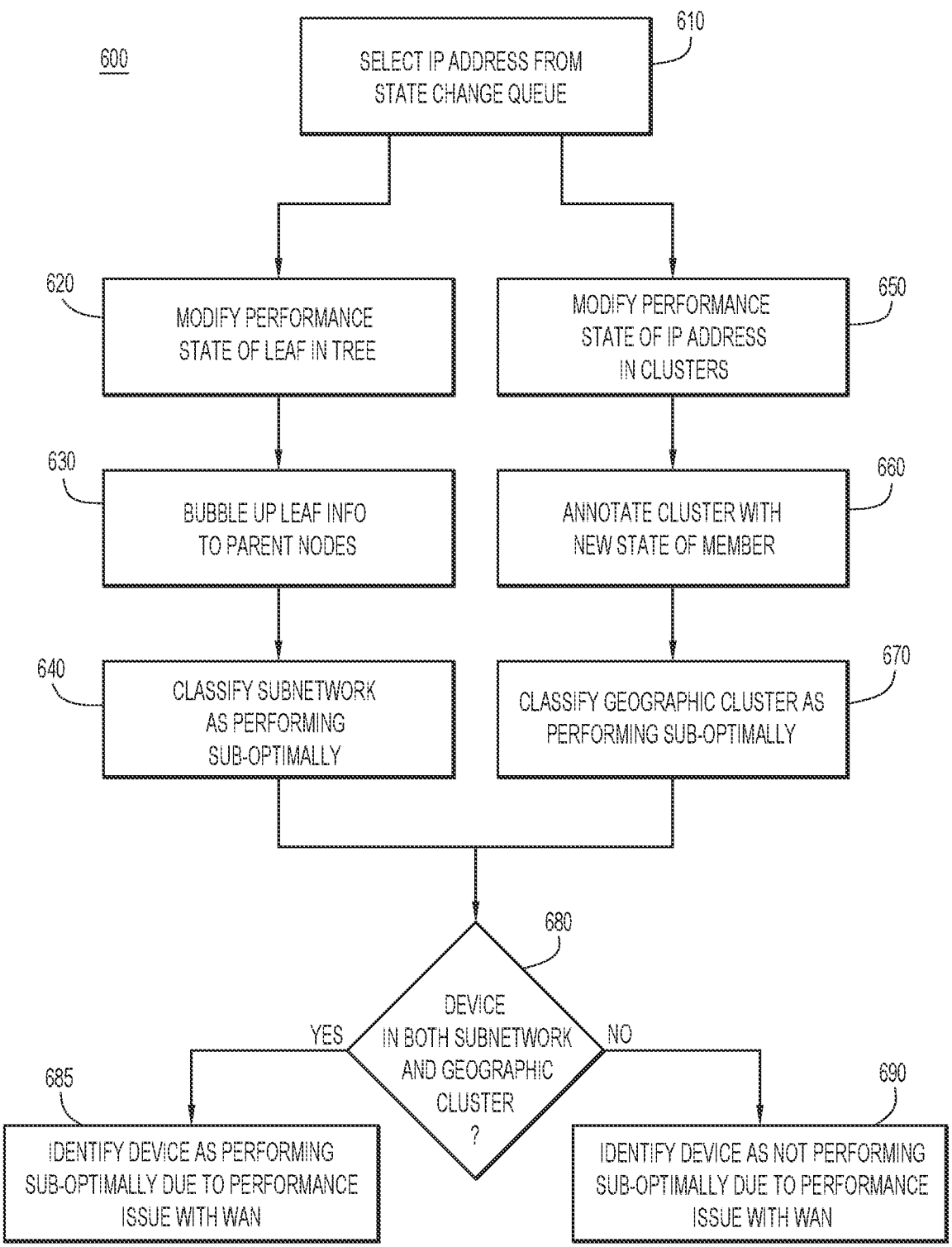
FIG. 6 is a flowchart of a method for determining the cause of sub-optimal network device performance, according to an example embodiment.

FIG. 6 is a flowchart of an example method 600 for determining the cause of sub-optimal network device performance. Reference may be made to FIG. 1 for the purposes of describing FIG. 6. Method 600 may be performed by analysis server 150. At 610, analysis server 150 selects an IP address from the state change queue. In one example, analysis server 150 continuously monitors the state change queue and selects one IP address at a time. Operations 620-670 may be performed in any acceptable order. For example, operations 620-640 may be performed simultaneous to, before, or after operations 650-670. For the purposes of the description of method 600, operations 620-640 (relating to the IP address tree) will be described first, followed by operations 650-670 (relating to the geographic clusters).

At 620, analysis server 150 modifies the performance state of the leaf (e.g., IP address) in the IP address tree. At 630, analysis server 150 bubbles up the leaf performance status to its BGP advertised parent node(s). In particular, analysis server 150 updates parent nodes recursively until reaching the root node. Thus, each parent node monitors the state of its children (e.g., a parent node with two online children will know zero out of two children are offline). Certain parent nodes may monitor the total state of the subnetwork (e.g., the parent node for a /24 prefix may know that out of 254 possible hosts, performance status information for 100 is available, and four out of 100 are currently unreachable).

At 640, analysis server 150 classifies a subnetwork of network devices as performing sub-optimally (e.g., as being online or offline). It may not be pragmatic for analysis server 150 to wait for every single network device to go offline before classifying the entire subnetwork as offline because it may not be possible to determine the performance status (e.g., online/offline status) of every network device in the subnetwork within a reasonable timeframe. As such, if a sufficient number of network devices in a subnetwork go offline, analysis server 150 may classify the entire subnetwork as offline.

Analysis server 150 may use any suitable machine learning algorithm and/or heuristics to determine the appropriate number of network devices required to classify the entire subnetwork as performing sub-optimally. Furthermore, with active and passive measurements detecting packet loss and latency, performance problems beyond outages may be identified. For example, edges of the Internet that are experiencing high packet loss or latency may be detected. With traceroute built into loss and latency data, performance problems caused by issues beyond the edge may be identified. For example, loss or latency of particular flows may be traced back to particular data centers, Internet exchange points, or ASs.

At 650, analysis server 150 modifies the performance state of the IP address in a geographic cluster. At 660, analysis server 150 annotates the cluster with the new online/offline state of the member IP address. The geographic cluster may monitor the state of its member IP addresses (e.g., a geographic cluster with two online members and thirty offline members may know that thirty out of thirty-two members are offline).

At 670, analysis server 150 classifies a geographic cluster of network devices as performing sub-optimally (e.g., as being online or offline). It may not be pragmatic for analysis server 150 to wait for every single network device to go offline before classifying the entire geographic cluster as offline because it may not be possible to determine the online/offline status of every network device in the geographic cluster within a reasonable timeframe. As such, if a sufficient number of network devices in a geographic cluster go offline, analysis server 150 may classify the entire geographic cluster as offline. Analysis server 150 may use any suitable machine learning algorithm and/or heuristics to determine the appropriate number of network devices to classify the entire subnetwork as performing sub-optimally.

At 680, analysis server 150 determines whether a particular sub-optimally performing network device is in both the subnetwork and the geographic cluster. Analysis server 150 may obtain the particular sub-optimally performing network device through some automated process or via manual input (e.g., from a network administrator). If it is determined that the particular sub-optimally performing network device is in both the subnetwork and the geographic cluster, at 685 analysis server 150 identifies the particular sub-optimally performing network device as performing sub-optimally due to a performance issue with a WAN to which the particular sub-optimally performing network device belongs (e.g., WAN 105). If it is determined that the particular sub-optimally performing network device is not in both the subnetwork and the geographic cluster, at 690 analysis server 150 identifies the particular sub-optimally performing network device as not performing sub-optimally due to the performance issue with WAN 105.

Figure 7:
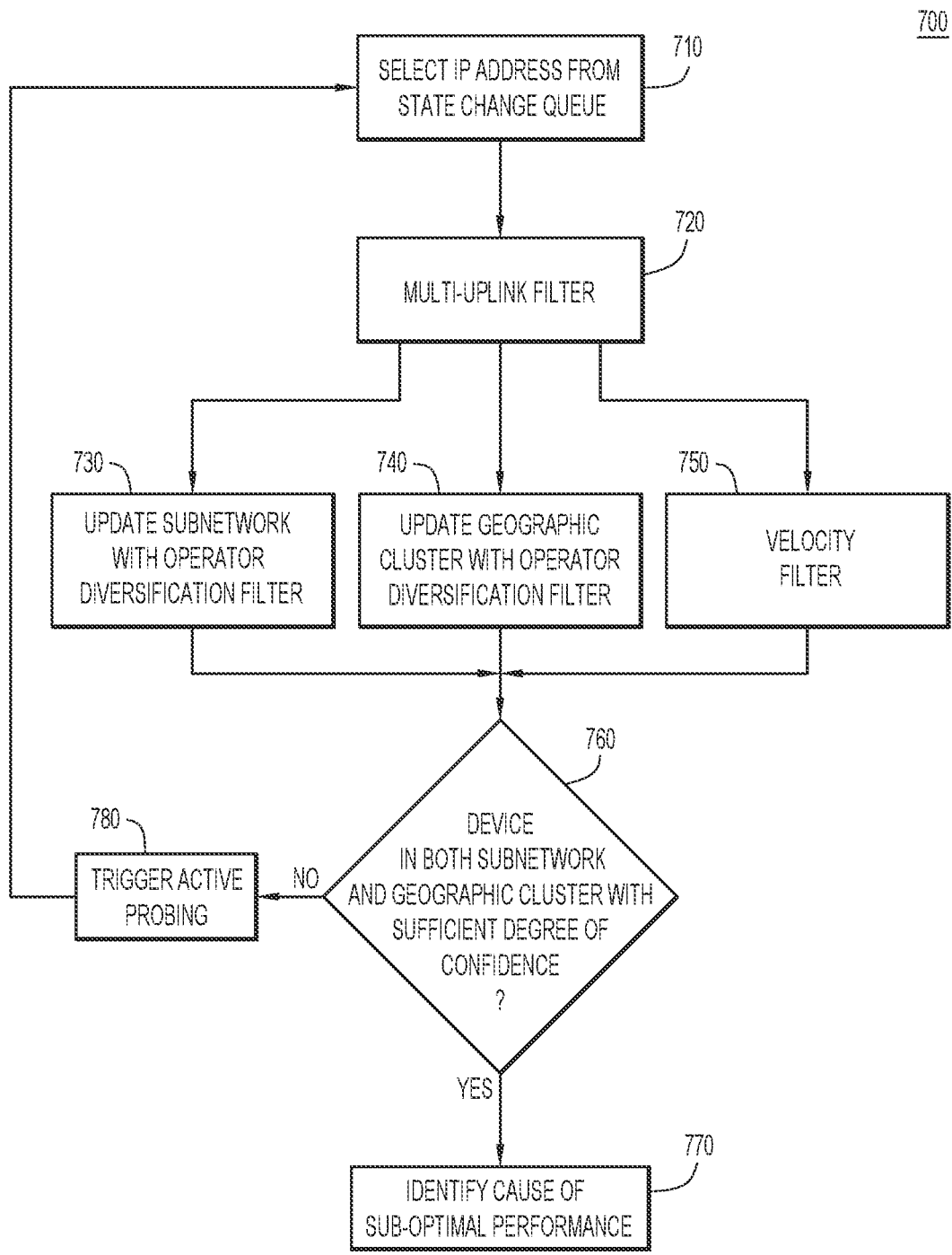
FIG. 7 is a flowchart of another method for determining the cause of sub-optimal network device performance, according to an example embodiment.

FIG. 7 is a flowchart of an example method 700 for determining the cause of sub-optimal network device performance. Reference may be made to FIG. 1 for the purposes of describing FIG. 7. Method 700 may be performed by analysis server 150. At 710, analysis server 150 selects an IP address from the state change queue. In one example, analysis server 150 continuously monitors the state change queue and selects one IP address at a time.

At 720, analysis server 150 passes the data associated with the selected IP address through a multi-uplink filter. Briefly, the multi-uplink filter enables analysis server 150 to classify the subnetwork and/or geographic cluster of network devices as performing sub-optimally based on one or more uplinks of the network devices in the subnetwork. For example, network devices may have multiple (e.g., two, three, etc.) uplinks, one of which may be a cellular uplink. This may help improve confidence in a determination of the relationship between the status of a single geographic location and the subnetworks that service that geographic location.

In one example, a device has three uplinks each served by a different ISP, where one of the uplinks is cellular. If all three uplinks go offline at the same time, this is a strong indication that the problem was unrelated to any particular ISP, and may instead be related to, e.g., a building power failure. However, if only one uplink goes offline and the other two uplinks remain online, this is a strong indication that the problem is related to the ISP of the offline uplink. In general, the ability to analyze multiple uplinks provides a stronger indication than observing whether a network device with only a single uplink is online or offline. The multi-uplink filter up-weights and/or down-weights input data based on the indications/signals from the uplinks grouped by device.

Operations 730-750 may be performed in any acceptable order (e.g., simultaneously, in order of element numbering, in reverse order of element numbering, etc.). At 730, analysis server 150 updates the subnetwork with the data using an operator diversification filter. Similarly, at 740, analysis server 150 updates the geographic cluster with the data using an operator diversification filter. Based on the updating, analysis server 150 may determine that the subnetwork and/or the geographic cluster are performing sub-optimally.

Briefly, an operator diversification filter enables classifying the subnetwork and/or geographic cluster of network devices as performing sub-optimally based on a number of operators of the network devices in the subnetwork. For example, in some cases, an organization might operate a sufficient number of network devices that those network devices represent a significant portion of the available information about a subnetwork or geographic location. If that organization misconfigured the network devices, a sufficient number of network devices might go offline that would incorrectly indicate a problem with all network devices in that subnetwork or geographic region. The operator diversification filter prevents such false positives by processing offline network devices based on network device owner and down-weighting outages that are used by the same operator.

At 750, analysis server 150 runs the data through a velocity filter. Briefly, the velocity filter enables classifying the subnetwork and/or geographic cluster of network devices as performing sub-optimally based on an expected number of sub-optimally performing network devices in the subnetwork and/or geographic cluster. At any given moment, some number of network devices may go offline for reasons that do not indicate a larger problem. For example, a network administrator may be performing maintenance on a rack and needs to unplug the network device, or a network device may become misconfigured, or some other problem might cause a network device to no longer be able to reach the backend.

These problems can occur somewhat randomly, and do not indicate a larger problem. However, taken in aggregate, analysis server 150 could theoretically misinterpret these isolated problems as indicative of a larger problem. The velocity filter tracks the velocity (rate) of outages. Over the course of a normal, non-problematic time period, the velocity of outages remains within a normal band. An ISP outage may result in a large number of devices going offline within a small time period, causing a spike in the outage velocity. As such, the velocity filter may be used in combination with the current state to determine whether a subnetwork and/or geographic cluster is experiencing an outage.

At 760, analysis server 150 determines whether a particular sub-optimally performing network device is (or is not) in both the sub-optimally performing subnetwork and the sub-optimally performing geographic cluster with a sufficient degree of confidence. Analysis server 150 may calculate the degree of confidence based on respective degrees of confidence associate with the subnetwork and geographic cluster. For example, analysis server 150 may calculate a first degree of confidence for which the subnetwork of network devices is performing sub-optimally, and a second degree of confidence for which the geographic cluster of network devices is performing sub-optimally. Based on the first and second degrees of confidence, analysis server 150 may calculate a degree of confidence for which the particular sub-optimally performing network device is performing sub-optimally due to a performance issue with the WAN, for example.

At 770, if analysis server 150 determines that there is a sufficient degree of confidence (e.g., above some threshold degree of confidence), analysis server 150 identifies the cause of the sub-optimal performance of the network device (e.g., WAN or otherwise). If analysis server 150 determines that the degree of confidence is insufficient (e.g., below some threshold degree of confidence), at 780 analysis server 150 triggers active probing of one or more network devices in the subnetwork and/or the geographic cluster determine whether the one or more network devices are performing sub-optimally. Analysis server 150 may trigger active probing instead of identifying the cause of the sub-optimal performance of the network device.

The degree of confidence may be insufficient, for example, because only limited data is available to analysis server 150. That is, analysis server 150 may not know (have information about) the performance status of every network device in a given subnetwork/geographic cluster. For some subnetworks/geographic clusters analysis server 150 may know (have information about) the performance status of many network devices, and for other subnetworks/geographic clusters analysis server 150 may know the performance status of only a few network devices. The fewer network devices whose states are known to the analysis server 150, the less is known about the performance status of the subnetwork/geographic cluster in the aggregate, and therefore the lower the degree of confidence that analysis server 150 can determine for the performance status of the subnetwork/geographic cluster.

Analysis server 150 may trigger active probing in order to obtain additional data about one or more network devices whose performance status is unknown to analysis server 150 via the state change queue. Initially analysis server 150 may build the list of IP addresses with an unknown status in that subnetwork and/or geographic cluster. Analysis server 150 may distribute that list to various geographically- and subnetwork-distributed servers. Those servers may send pings and traceroutes to the IP addresses on the list.

If it is determined that one or more of the network devices in the subnetwork are performing sub-optimally, analysis server 150 may increase the first degree of confidence (for which the subnetwork of network devices is performing sub-optimally). If it is determined that one or more of the network devices in the geographic cluster are performing sub-optimally, analysis server 150 may increase the second degree of confidence (for which the geographic cluster of network devices is performing sub-optimally). Increasing the first and/or second degree of confidence may in turn increase the degree of confidence of the status of the subnetwork and/or geographic cluster.

Figure 8:
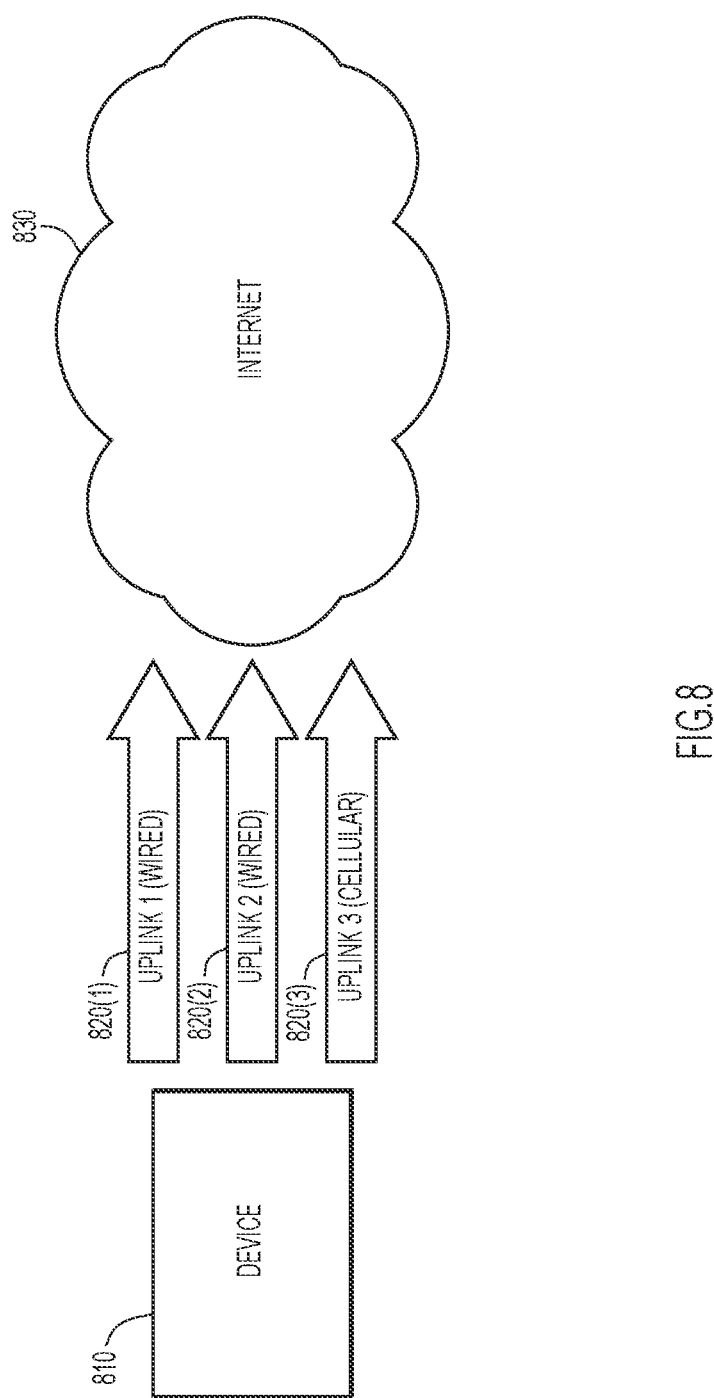
FIG. 8 illustrates a network device with multiple uplinks to the Internet, according to an example embodiment.
Figure 9:
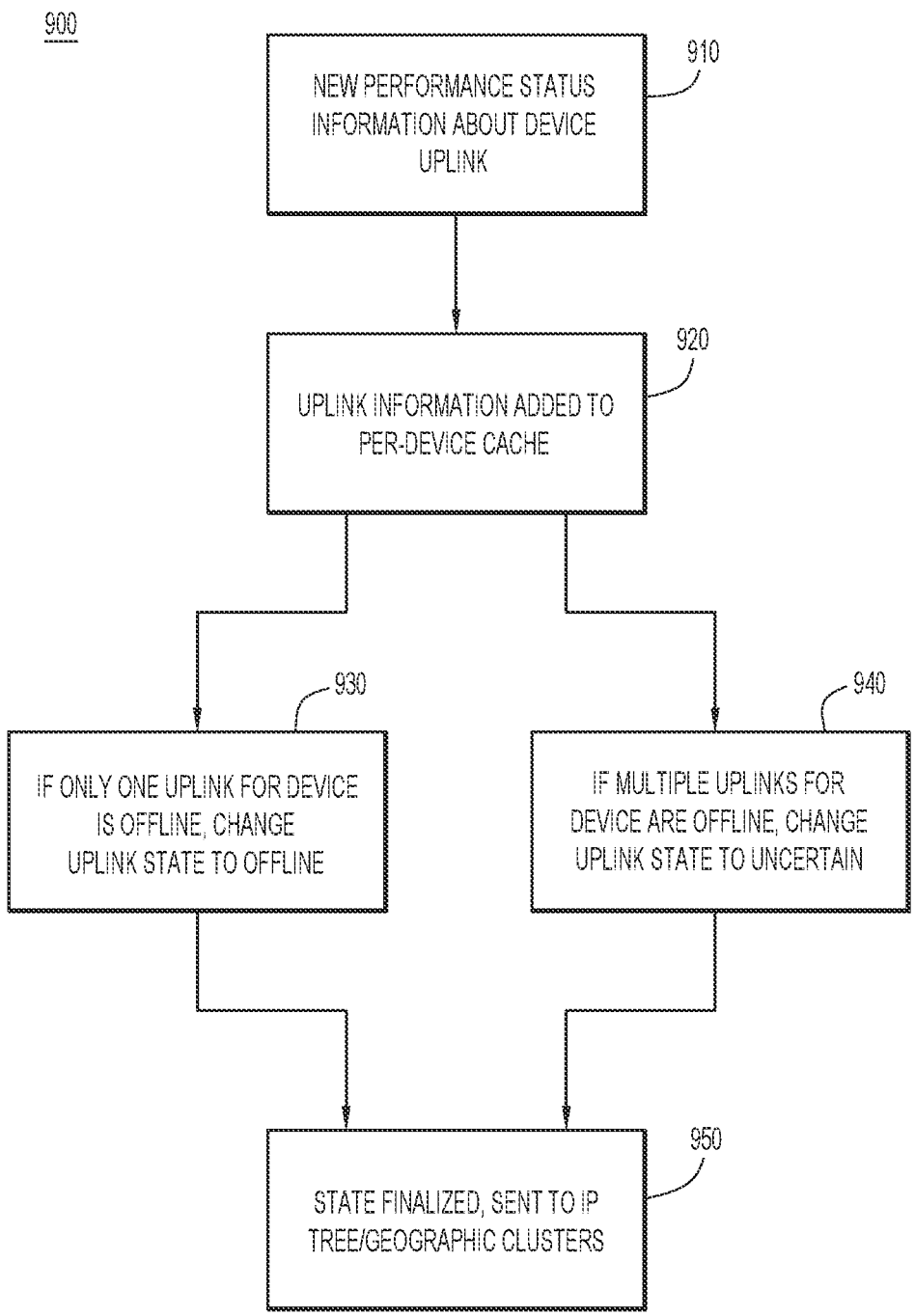
FIG. 9 is a flowchart of a method for determining the cause of sub-optimal network device performance based on the uplinks of a network device, according to an example embodiment.

FIGS. 8-13 provide further detail and example implementations for method 700. FIGS. 8 and 9 relate to the multi-uplink filter, FIGS. 10A-10C and 11 relate to the operator diversification filter, FIG. 12 relates to the velocity filter, and FIG. 13 relates to triggering active probing. Reference to FIG. 1 may be made for the purposes of describing FIGS. 8-13.

FIG. 8 illustrates a network device 810 with multiple uplinks 820(1)-820(3) to the Internet 830, according to an example embodiment. Uplinks 820(1)-820(3) are serviced by different ISPs in order to provide a true failover. For example, uplinks 820(1)-820(3) may be serviced by ISPs A-C, respectively. If ISP A goes down, network device 810 may still be able to access the Internet 830 through uplinks 820(2) and/or 820(3) serviced by ISPs B and C. Furthermore, uplink 820(3) is a cellular link, as an example. This allows for a failover in the case of a physical problem (e.g., bad cabling, bad modem, etc.).

FIG. 9 is a flowchart of an example method 900 for determining the cause of sub-optimal network device performance based on the uplinks of a network device (multi-uplink filter). Reference to FIGS. 1 and 8 is made for the purposes of describing FIG. 9. Briefly, the multi-uplink filter runs as a pre-processing layer that maintains a per-device cache with the performance status of each uplink 820(1)-820(3) connected to network device 810. At 910, analysis server 150 receives new performance status information about one or more of uplinks 820(1)-820(3) (e.g., online/offline data), and at 920 analysis server 150 updates the cache with the new information about one or more of uplinks 820(1)-820(3). Based on the states of all uplinks 820(1)-820(3) for the device, analysis server 150 outputs a new result. At 930, if only one uplink is offline (e.g., uplink 820(1), the status of uplink 820(1) may be offline. At 940, if multiple uplinks are offline (e.g., 820(1)-820(3)), the status of uplinks 820(1)-820(3) may be uncertain. This helps reduce noise by cutting out data caused not by an outage on the Internet 830, but rather by a local problem such as a power failure. At 950, the uplink state may be finalized and sent to the IP address tree and/or geographic cluster.

Figure 10A:
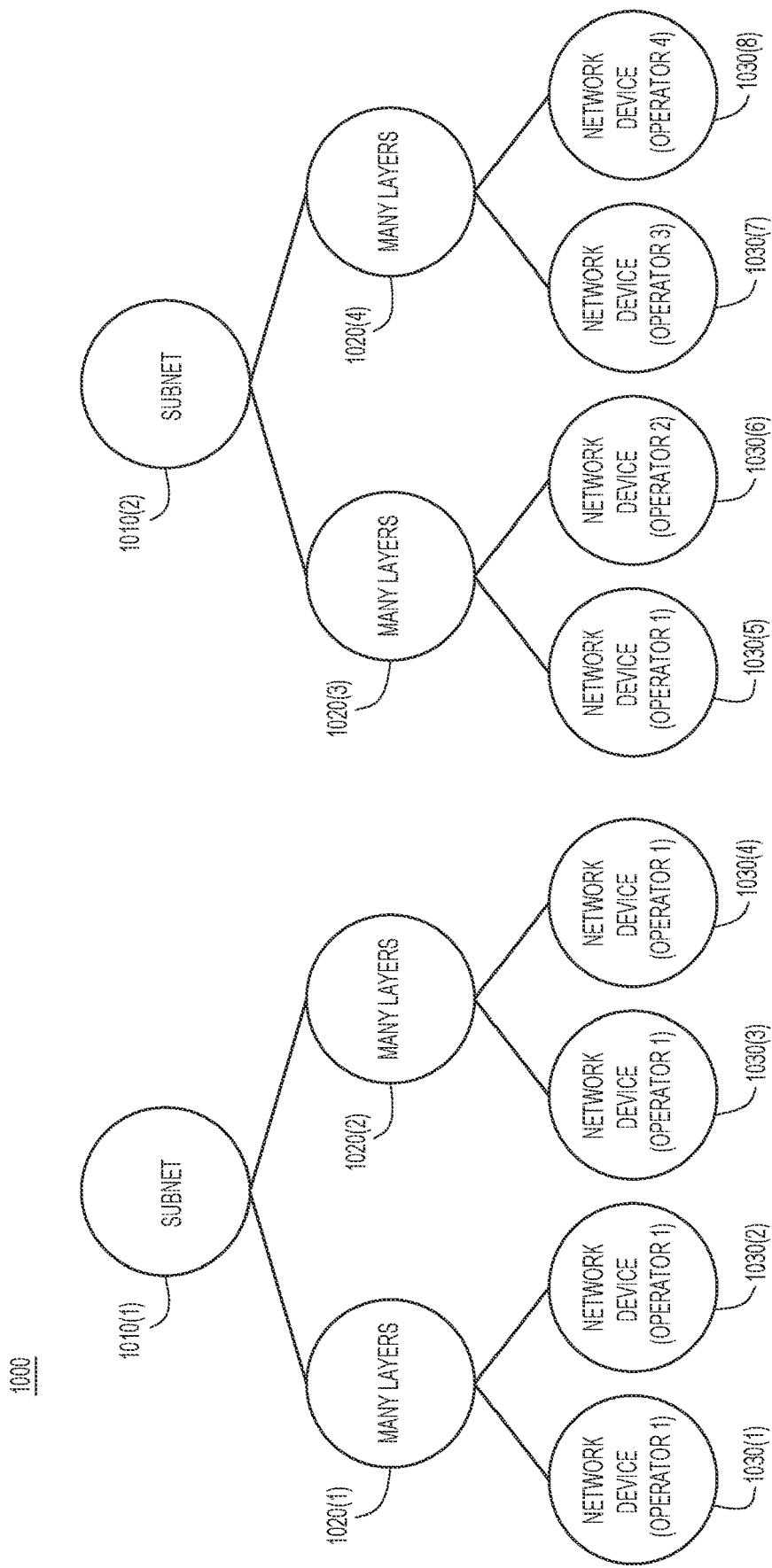
FIGS. 10A-10C illustrate a system of two subnetworks, where one of the subnetworks includes network devices managed by a single operator and the other subnetwork includes network devices managed by multiple operators, according to an example embodiment.
Figure 10B:
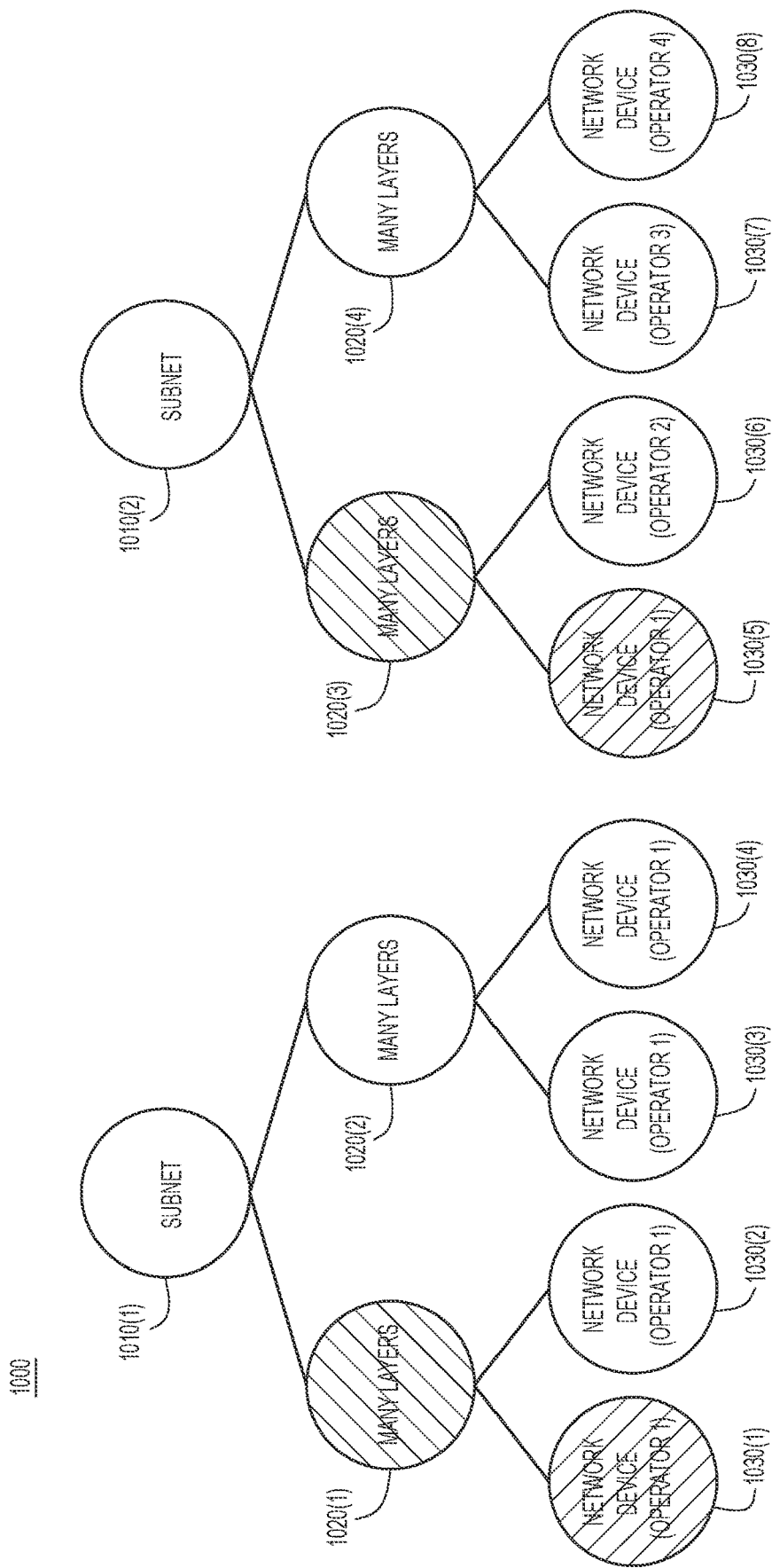
Figure 10C:
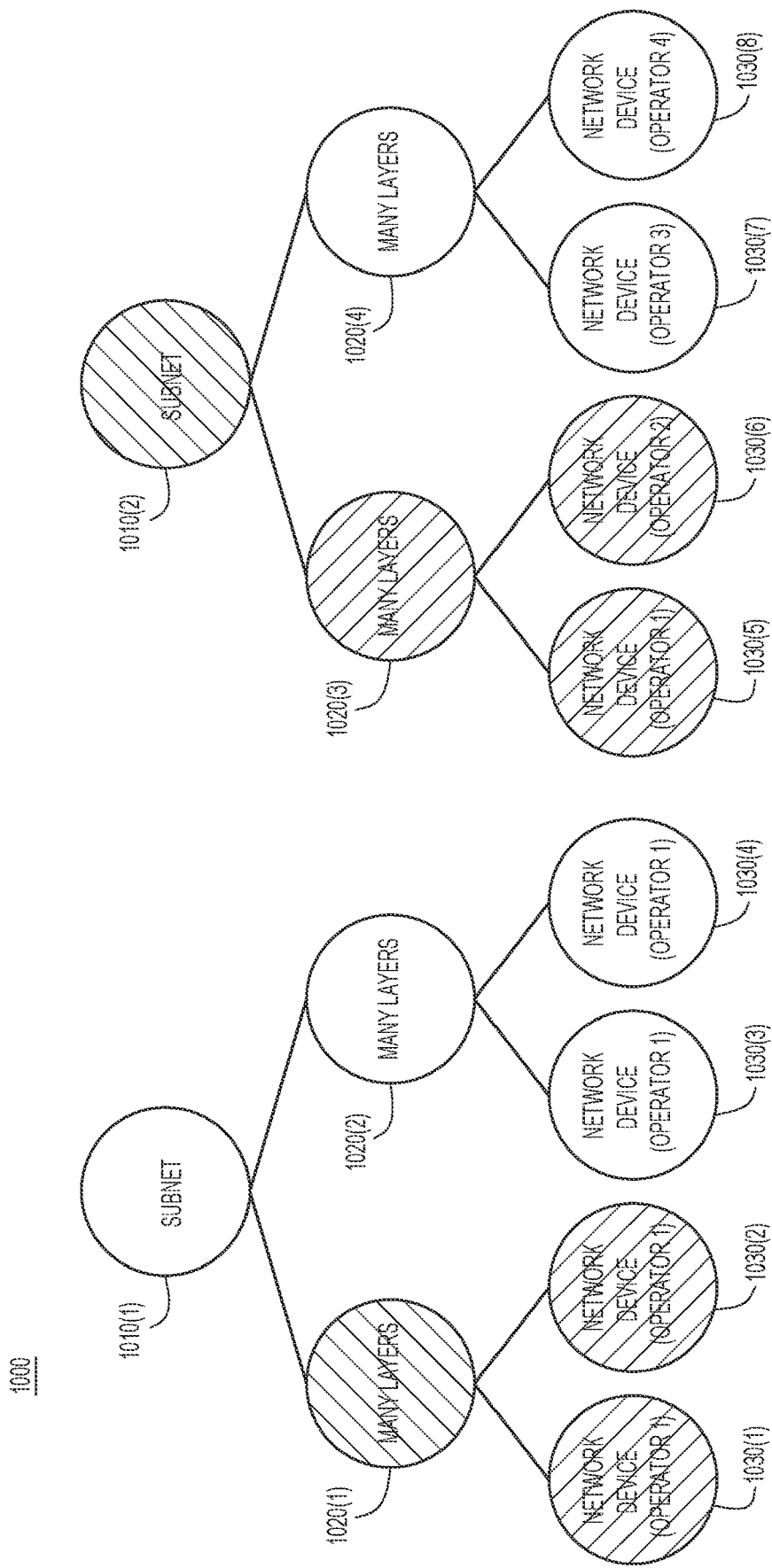

FIGS. 10A-10C illustrate an example system 1000 of two subnetworks 1010(1) and 1010(2) at sequential points in time. Subnetwork 1010(1) is a parent node for layers 1020(1) and 1020(2). Layers 1020(1) are represented as a parent node for network devices 1030(1) and 1030(2). Layers 1020(2) are represented as a parent node for network devices 1030(3) and 1030(4). Similarly, subnetwork 1010(2) is a parent node for layers 1020(3) and 1020(4). Layers 1020(3) are represented as a parent node for network devices 1030(5) and 1030(6). Layers 1020(4) are represented as a parent node for network devices 1030(7) and 1030(8). In subnetwork 1010(1), network devices 1030(1)-1030(4) are all managed by a single operator (e.g., enterprise). In subnetwork 1010(2), each of network devices 1030(5)-1030(8) is managed by a different operator.

In FIG. 10A, all network devices 1030(1)-1030(8) are online, and thus subnetworks 1010(1) and 1010(2) are considered online. In FIG. 10B, network devices 1030(1) and 1030(5) go offline. Layers 1020(1) and 1020(3) observe that network devices 1030(1) and 1030(5) have gone offline, respectively, and mark themselves as being partially offline. Subnetworks 1010(1) and 1010(2) are still marked as online because the vast majority of their network devices (network devices 1030(2)-1030(4) and 1030(6)-1030(8)) are still online.

In FIG. 10C, network devices 1030(2) and 1030(6) go offline. Layers 1020(1) and 1020(3) observe that network devices 1030(2) and 1030(6) have gone offline, respectively. In subnetwork 1010(1), layers 1020(1) note that network devices 1030(1) and 1030(2) are operated by the same operator, and therefore mark themselves as being in a problem state with low confidence. Subnetwork 1010(1) observes that layers 1020(1) and 1020(2) are either online or uncertain and therefore remains in the online state. In the second subnetwork 1010(2), layers 1020(2) note that network devices 1030(5) and 1030(6) have different operators, and therefore mark themselves as being in a problem state with high confidence. Subnetwork 1010(2) observes that layers 1020(3) and 1020(4) are either offline with high confidence or online with high confidence, and therefore changes its state to problematic. Accordingly, subnetworks 1010(1) and 1010(2) have different performance states in spite of their similar structures because network devices 1030(1)-1030(4) have the same operator while network devices 1030(5)-1030(8) have different operators.

Figure 11:
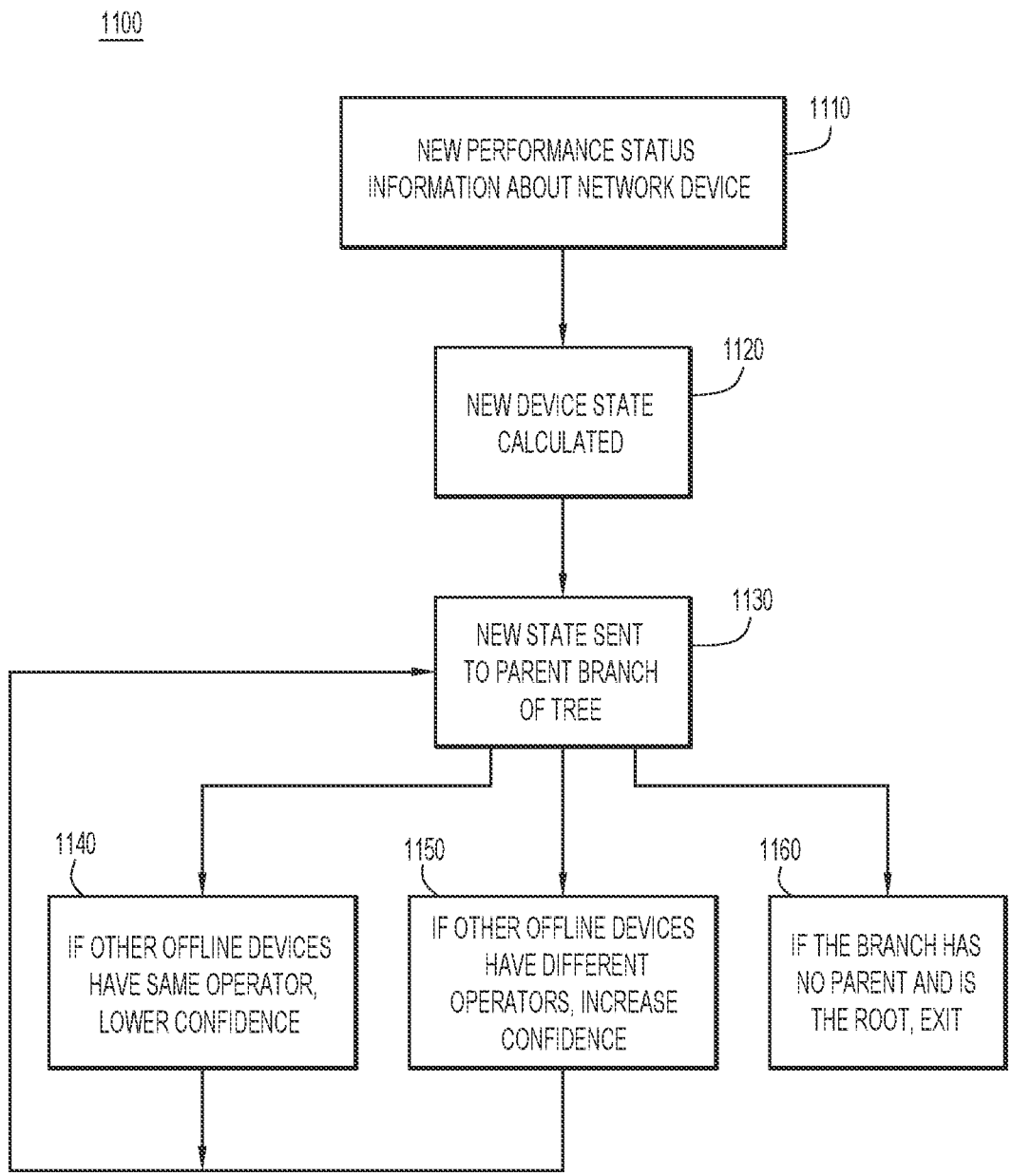
FIG. 11 is a flowchart of a method for determining the cause of sub-optimal network device performance based on a number of operators in a subnetwork or geographical area, according to an example embodiment.

FIG. 11 is a flowchart of an example method 1100 for determining the cause of sub-optimal network device performance based on a number of operators in a subnetwork or geographical area (operator diversification filter). Reference is made to FIG. 1 for the purposes of describing FIG. 11. Briefly, the operator diversification filter runs at each layer of the IP address tree to help determine the state of each leaf or branch of the tree. At each branch of the tree, as the information about the performance status of a network device bubbles up, the operator diversification filter checks for the total number of operators of sub-optimally performing network devices and modifies the confidence level of the branch performance state depending on the number of unique operators. For example, the more unique operators detected, the higher the confidence level.

Analysis server 150 may perform method 1100. At 1110, analysis server 150 receives new performance status information about a network device (e.g., via a state change queue). In this example, the performance status information indicates that the network device is now offline. At 1120, analysis server 150 calculates a new performance state of the network device. At 1130, analysis server 150 sends the new state to the parent branch of the tree. At 1140, if the other offline network devices have the same operator as the network device at issue, analysis server 150 sets the new performance state for the parent branch with a lower confidence. At 1150, if the other offline network devices have different operators from that of the network device at issue, analysis server 150 sets the new performance state for the parent branch with a higher confidence. Method 1100 returns to operation 1130 after operations 1140 or 1150. At 1160, if the branch has no parent and is the root node, the method ends.

Figure 12:
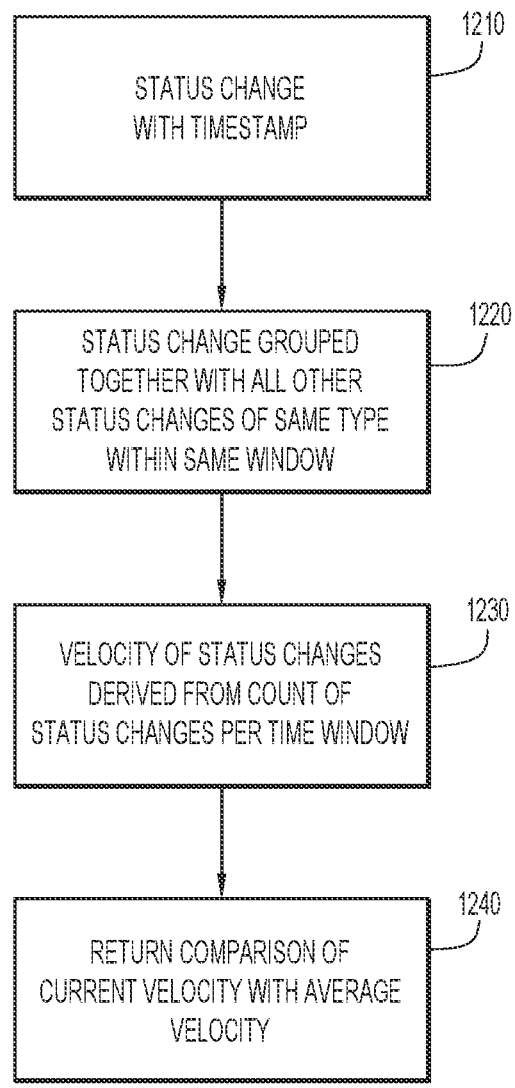
FIG. 12 is a flowchart of a method for determining the cause of sub-optimal network device performance based on an expected number of sub-optimally performing network devices, according to an example embodiment.

FIG. 12 is a flowchart of an example method 1200 for determining the cause of sub-optimal network device performance based on an expected number of sub-optimally performing network devices (velocity filter). Reference is made to FIG. 1 for the purposes of describing FIG. 12. Method 1200 may be performed by analysis server 150. At 1210, analysis server 150 receives status changes and the time (e.g., timestamp) at which the status changed. At 1220, analysis server 150 groups status changes of the same type (e.g., offline to online) that occurred over the same time period (e.g., a one-minute window from 14:02-14:03 UTC). At 1230, based on those groupings, analysis server 150 derives the velocity of status changes by tracking the count of status changes per group against the group time window. At 1240, analysis server 150 compares the current velocity of status changes against the average velocity of status changes in order to determine whether the current acceleration is great enough to be considered an outage. By examining the acceleration of outages in addition to the count of outages, analysis server 150 may rule out false positives caused by a number of overlapping outages that may have been long running but did not start at the same time.

Figure 13:
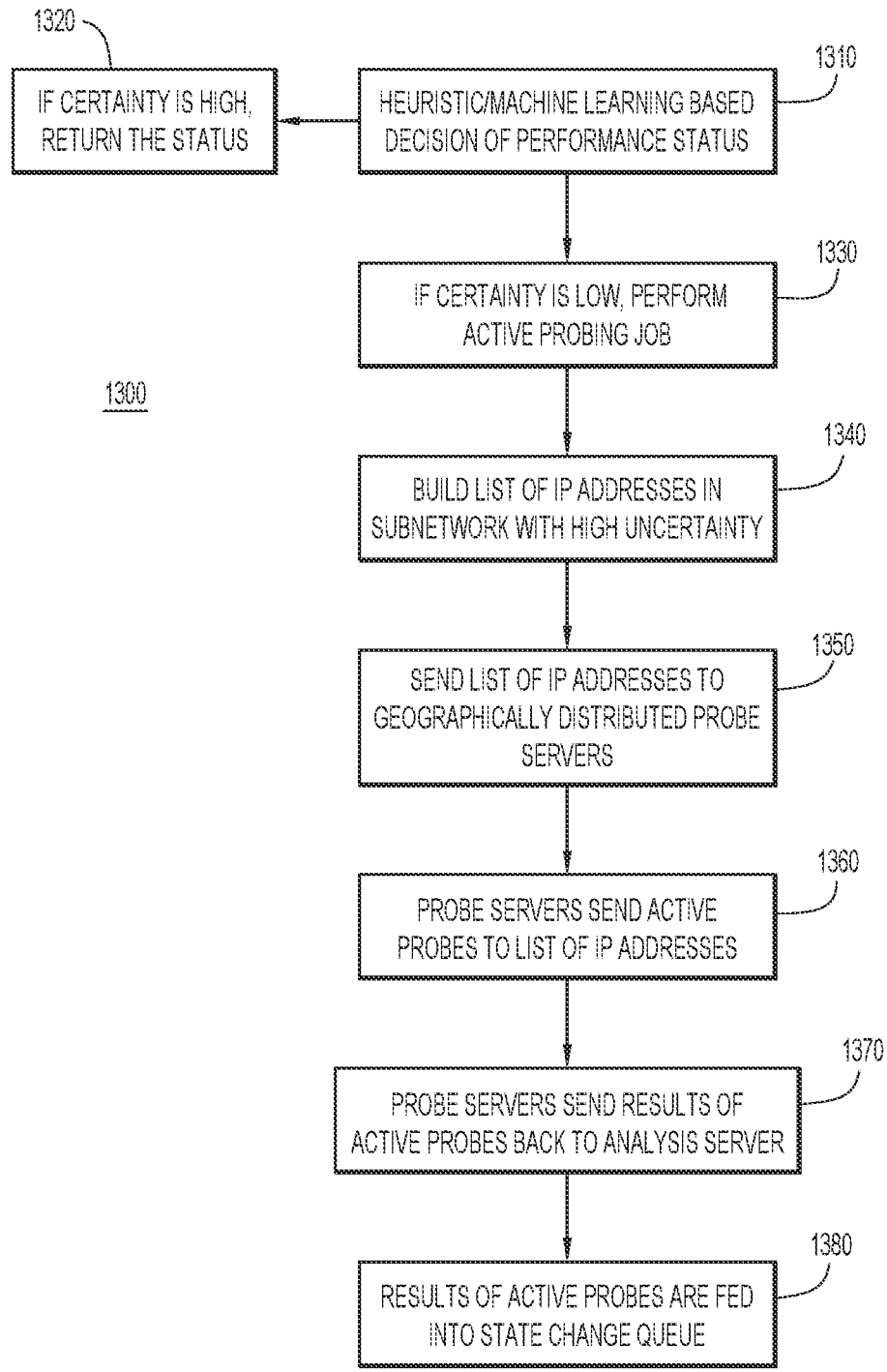
FIG. 13 is a flowchart of a method for actively probing one or more network devices to increase confidence in the determined cause of sub-optimal network device performance, according to an example embodiment.

FIG. 13 is a flowchart of an example method 1300 for actively probing one or more network devices to increase confidence in the determined cause of sub-optimal network device performance. Reference is made to FIG. 1 for the purposes of describing FIG. 13. Method 1300 may be performed by analysis server 150. At 1310, analysis server 150 makes a heuristic/machine learning decision as to the performance status of a subnetwork or geographic location. This decision acts as a potential trigger. At 1320, if the performance status has high certainty, analysis server 150 may return/report the performance status. At 1330, if the performance status has low certainty, analysis server 150 performs an active probe job in order to increase the certainty. The goal of the active probe job is to add more information about the subnetwork or geographic location about which analysis server 150 is uncertain.

To that end, at 1340, analysis server 150 builds the list of IP addresses in that subnetwork or geographic location. At 1350, analysis server 150 sends that list to a number of geographically distributed active probe servers (e.g., probe servers 145(1)-145(3)). At 1360, the probe servers may send probes to those IP addresses. The probe servers may compile the list of results showing which IP addresses responded and which did not. At 1370, the results are sent to analysis server 150. At 1380, analysis server 150 feeds the results back into the state change queue. At this point, analysis server 150 may have an increased confidence about the state of the subnetwork or geographic location in question.

Figure 14:
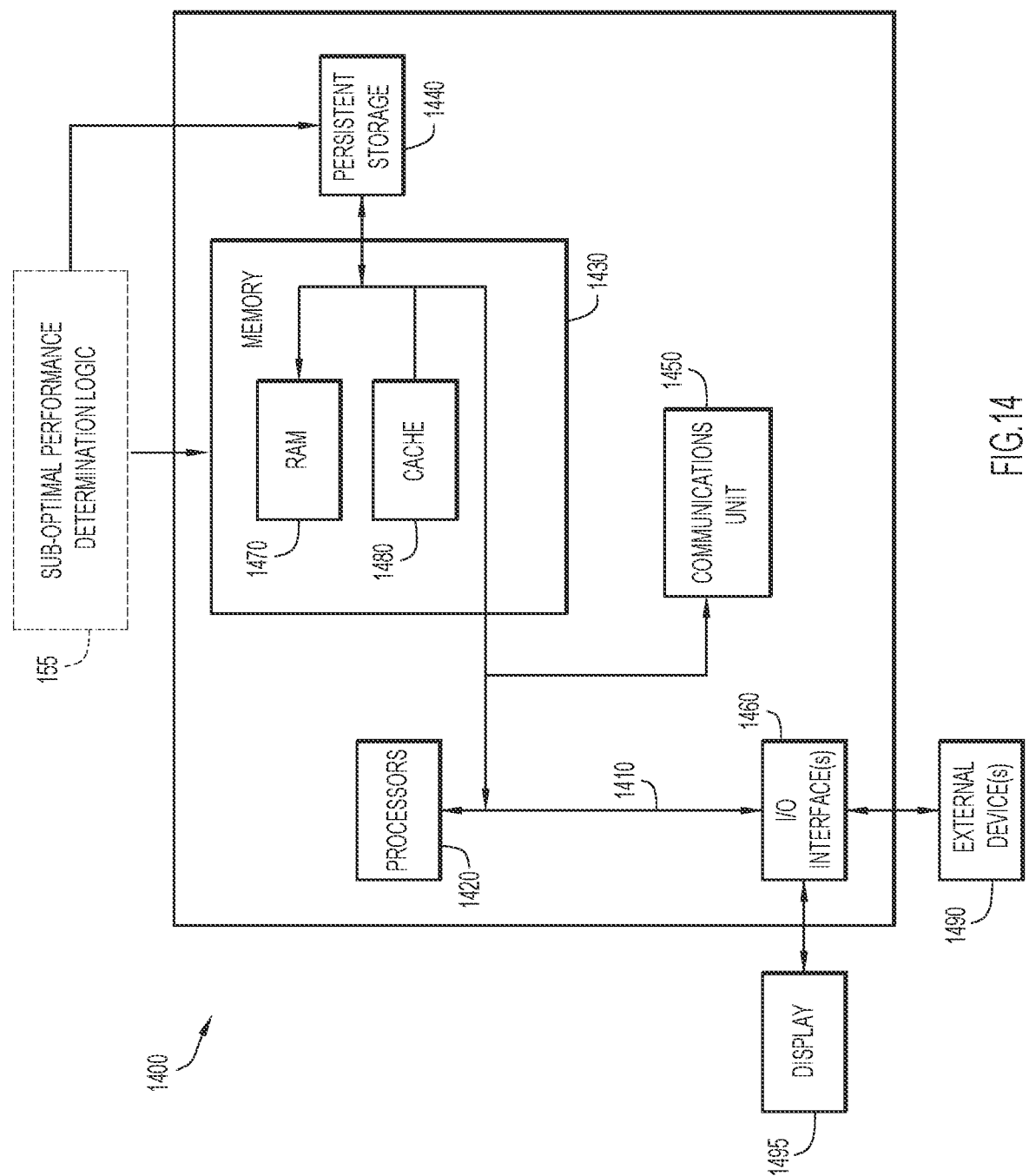
FIG. 14 is a block diagram of a computing device configured to determine the cause of sub-optimal network device performance, according to an example embodiment.

FIG. 14 illustrates a hardware block diagram of a computing device 1400 that may perform the functions of any of the servers or computing or control entities referred to herein in connection with sub-optimal performance determination. It should be appreciated that FIG. 14 provides only an illustration of one embodiment and does not imply any limitations with regard to the environments in which different embodiments may be implemented. Many modifications to the depicted environment may be made.

As depicted, the device 1400 includes a bus 1410, which provides communications between computer processor(s) 1420, memory 1430, persistent storage 1440, communications unit 1450, and input/output (I/O) interface(s) 1460. Bus 1410 may be implemented with any architecture designed for passing data and/or control information between processors (such as microprocessors, communications and network processors, etc.), system memory, peripheral devices, and any other hardware components within a system. For example, bus 1410 may be implemented with one or more buses.

Memory 1430 and persistent storage 1440 are computer readable storage media. In the depicted embodiment, memory 1430 includes random access memory (RAM) 1470 and cache memory 1480. In general, memory 1430 may include any suitable volatile or non-volatile computer readable storage media. Instructions for sub-optimal performance determination logic 155 may be stored in memory 1430 or persistent storage 1440 for execution by processor(s) 1420.

One or more programs may be stored in persistent storage 1440 for execution by one or more of the respective computer processors 1420 via one or more memories of memory 1430. The persistent storage 1440 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 1440 may also be removable. For example, a removable hard drive may be used for persistent storage 1440. Other examples include optical and magnetic disks, thumb drives, and smart cards that are inserted into a drive for transfer onto another computer readable storage medium that is also part of persistent storage 1440.

Communications unit 1450, in these examples, provides for communications with other data processing systems or devices. In these examples, communications unit 1450 includes one or more network interface cards. Communications unit 1450 may provide communications through the use of either or both physical and wireless communications links.

I/O interface(s) 1460 allows for input and output of data with other devices that may be connected to computer device 1400. For example, I/O interface 1460 may provide a connection to external devices 1490 such as a keyboard, keypad, a touch screen, and/or some other suitable input device. External devices 1490 may also include portable computer readable storage media such as database systems, thumb drives, portable optical or magnetic disks, and memory cards.

Software and data used to practice embodiments may be stored on such portable computer readable storage media and may be loaded onto persistent storage 1440 via I/O interface(s) 1460. I/O interface(s) 1460 may also connect to a display 1495. Display 1495 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an ISP). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 15:
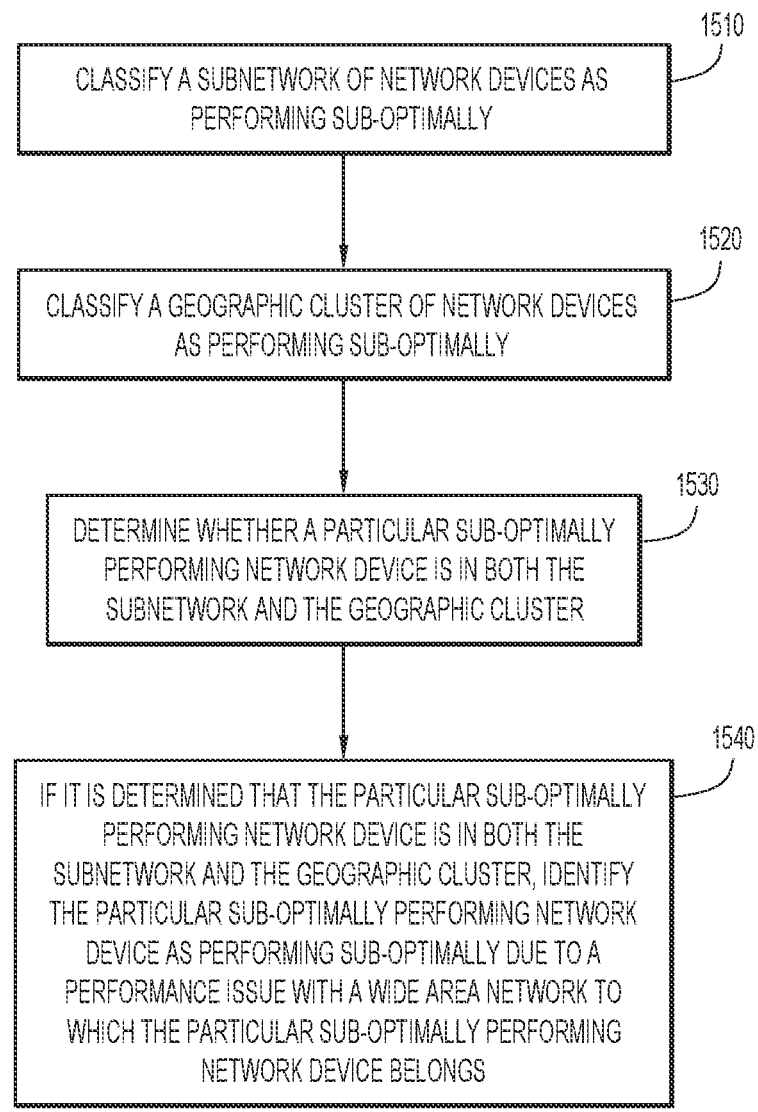
FIG. 15 is a flowchart of a generalized method for determining the cause of sub-optimal network device performance, according to an example embodiment.

FIG. 15 is a flowchart of an example method 1500 for determining the cause of sub-optimal network device performance. Method 1500 may be performed by a server (e.g., analysis server 150). At 1510, the server classifies a subnetwork of network devices as performing sub-optimally. At 1520, the server classifies a geographic cluster of network devices as performing sub-optimally. At 1530, the server determines whether a particular sub-optimally performing network device is in both the subnetwork and the geographic cluster. At 1540, if it is determined that the particular sub-optimally performing network device is in both the subnetwork and the geographic cluster, the server identifies the particular sub-optimally performing network device as performing sub-optimally due to a performance issue with a Wide Area Network to which the particular sub-optimally performing network device belongs.

By causing devices in the field to check in with a backend at regular intervals and using active probing techniques, a tree of IP space may be built is known to be up or down or experiencing performance problems. Using BGP advertisements and additional information that links ASs to IP prefixes, that tree may be split by owner of the advertised IP space. Finally, by using geographic information about the locations of each known IP address, geographic clusters of outages and performance problems may be built. All of this data may be combined to determine the location of widespread internet outages and performance problems in real time. Techniques described herein may use both beacon data and active probing to gain higher confidence in IP address availability, and use location data to perform geographic cross-correlation against the IP address availability data. These techniques may also identify network availability as well as network performance degradations across the Internet.

In one form, a method is provided. The method comprises: classifying a subnetwork of network devices as performing sub-optimally; classifying a geographic cluster of network devices as performing sub-optimally; determining whether a particular sub-optimally performing network device is in both the subnetwork and the geographic cluster; and if it is determined that the particular sub-optimally performing network device is in both the subnetwork and the geographic cluster, identifying the particular sub-optimally performing network device as performing sub-optimally due to a performance issue with a Wide Area Network to which the particular sub-optimally performing network device belongs.

In one example, the method further comprises: if it is determined that the particular sub-optimally performing network device is not in both the subnetwork and the geographic cluster, identifying the particular sub-optimally performing network device as not performing sub-optimally due to the performance issue with the Wide Area Network to which the particular sub-optimally performing network device belongs.

In one example, classifying the subnetwork of network devices as performing sub-optimally includes classifying the subnetwork of network devices as performing sub-optimally based on one or more uplinks of the network devices in the subnetwork; or classifying the geographic cluster of network devices as performing sub-optimally includes classifying the geographic cluster of network devices as performing sub-optimally based on one or more uplinks of the network devices in the geographic cluster.

In one example, classifying the subnetwork of network devices as performing sub-optimally includes classifying the subnetwork of network devices as performing sub-optimally based on a number of operators of the network devices in the subnetwork; or classifying the geographic cluster of network devices as performing sub-optimally includes classifying the geographic cluster of network devices as performing sub-optimally based on a number of operators of the network devices in the geographic cluster.

In one example, classifying the subnetwork of network devices as performing sub-optimally includes classifying the subnetwork of network devices as performing sub-optimally based on an expected number of sub-optimally performing network devices in the subnetwork; or classifying the geographic cluster of network devices as performing sub-optimally includes classifying the geographic cluster of network devices as performing sub-optimally based on an expected number of sub-optimally performing network devices in the geographic cluster.

In one example, the method further comprises: calculating a first degree of confidence for which the subnetwork of network devices is performing sub-optimally; calculating a second degree of confidence for which the geographic cluster of network devices is performing sub-optimally; and based on the first degree of confidence and the second degree of confidence, calculating a third degree of confidence for which the particular sub-optimally performing network device is performing sub-optimally due to the performance issue with the Wide Area Network to which the particular sub-optimally performing network device belongs.

In one further example, the method further comprises: actively probing one or more of the network devices in the subnetwork to determine whether the one or more of the network devices in the subnetwork are performing sub-optimally; and if it is determined that the one or more of the network devices in the subnetwork are performing sub-optimally, increasing the first degree of confidence. In another further example, the method further comprises: actively probing one or more of the network devices in the geographic cluster to determine whether the one or more of the network devices in the geographic cluster are performing sub-optimally; and if it is determined that the one or more of the network devices in the geographic cluster are performing sub-optimally, increasing the second degree of confidence.

In another form, an apparatus is provided. The apparatus comprises: a network interface configured to provide and/or obtain network traffic; and one or more processors coupled to the network interface, wherein the one or more processors are configured to: classify a subnetwork of network devices as performing sub-optimally; classify a geographic cluster of network devices as performing sub-optimally; determine whether a particular sub-optimally performing network device is in both the subnetwork and the geographic cluster; and if it is determined that the particular sub-optimally performing network device is in both the subnetwork and the geographic cluster, identify the particular sub-optimally performing network device as performing sub-optimally due to a performance issue with a Wide Area Network to which the particular sub-optimally performing network device belongs.

In another form, one or more non-transitory computer readable storage media are provided. The non-transitory computer readable storage media are encoded with instructions that, when executed by a processor, cause the processor to: classify a subnetwork of network devices as performing sub-optimally; classify a geographic cluster of network devices as performing sub-optimally; determine whether a particular sub-optimally performing network device is in both the subnetwork and the geographic cluster; and if it is determined that the particular sub-optimally performing network device is in both the subnetwork and the geographic cluster, identify the particular sub-optimally performing network device as performing sub-optimally due to a performance issue with a Wide Area Network to which the particular sub-optimally performing network device belongs.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   classifying a subnetwork of network devices as performing sub-optimally;
   classifying a geographic cluster of network devices as performing sub-optimally;
   determining whether a particular sub-optimally performing network device is in both the subnetwork and the geographic cluster;
   if it is determined that the particular sub-optimally performing network device is in both the subnetwork and the geographic cluster, identifying the particular sub-optimally performing network device as performing sub-optimally due to a performance issue with a Wide Area Network to which the particular sub-optimally performing network device belongs, wherein the Wide Area Network includes a plurality of subnetworks including the subnetwork, and wherein the subnetwork includes a set of Internet Protocol addresses; and
   calculating a first degree of confidence for which the particular sub-optimally performing network device is performing sub-optimally due to the performance issue with the Wide Area Network.

2. The method of claim 1, further comprising:
   if it is determined that the particular sub-optimally performing network device is not in both the subnetwork and the geographic cluster, identifying the particular sub-optimally performing network device as not performing sub-optimally due to the performance issue with the Wide Area Network to which the particular sub-optimally performing network device belongs.

3. The method of claim 1, wherein:
   classifying the subnetwork of network devices as performing sub-optimally includes classifying the subnetwork of network devices as performing sub-optimally based on one or more uplinks of the network devices in the subnetwork; or
   classifying the geographic cluster of network devices as performing sub-optimally includes classifying the geographic cluster of network devices as performing sub-optimally based on one or more uplinks of the network devices in the geographic cluster.

4. The method of claim 1, wherein:
   classifying the subnetwork of network devices as performing sub-optimally includes classifying the subnetwork of network devices as performing sub-optimally based on a number of operators of the network devices in the subnetwork; or
   classifying the geographic cluster of network devices as performing sub-optimally includes classifying the geographic cluster of network devices as performing sub-optimally based on a number of operators of the network devices in the geographic cluster.

5. The method of claim 1, wherein:
   classifying the subnetwork of network devices as performing sub-optimally includes classifying the subnetwork of network devices as performing sub-optimally based on an expected number of sub-optimally performing network devices in the subnetwork; or
   classifying the geographic cluster of network devices as performing sub-optimally includes classifying the geographic cluster of network devices as performing sub-optimally based on an expected number of sub-optimally performing network devices in the geographic cluster.

6. The method of claim 1, further comprising:
   calculating a second degree of confidence for which the subnetwork of network devices is performing sub-optimally; and
   calculating a third degree of confidence for which the geographic cluster of network devices is performing sub-optimally, wherein
   calculating the first degree of confidence includes calculating the first degree of confidence based on the second degree of confidence and the third degree of confidence.

7. The method of claim 6, further comprising:
   actively probing one or more of the network devices in the subnetwork to determine whether the one or more of the network devices in the subnetwork are performing sub-optimally; and
   if it is determined that the one or more of the network devices in the subnetwork are performing sub-optimally, increasing the second degree of confidence.

8. The method of claim 6, further comprising:
   actively probing one or more of the network devices in the geographic cluster to determine whether the one or more of the network devices in the geographic cluster are performing sub-optimally; and
   if it is determined that the one or more of the network devices in the geographic cluster are performing sub-optimally, increasing the third degree of confidence.

9. An apparatus comprising:
   a network interface configured to provide and/or obtain network traffic; and
   one or more processors coupled to the network interface, wherein the one or more processors are configured to:
   classify a subnetwork of network devices as performing sub-optimally;
   classify a geographic cluster of network devices as performing sub-optimally;

determine whether a particular sub-optimally performing network device is in both the subnetwork and the geographic cluster;
if it is determined that the particular sub-optimally performing network device is in both the subnetwork and the geographic cluster, identify the particular sub-optimally performing network device as performing sub-optimally due to a performance issue with a Wide Area Network to which the particular sub-optimally performing network device belongs, wherein the Wide Area Network includes a plurality of subnetworks including the subnetwork, and wherein the subnetwork includes a set of Internet Protocol addresses; and
calculate a first degree of confidence for which the particular sub-optimally performing network device is performing sub-optimally due to the performance issue with the Wide Area Network.

10. The apparatus of claim 9, wherein the one or more processors are further configured to:
if it is determined that the particular sub-optimally performing network device is not in both the subnetwork and the geographic cluster, identify the particular sub-optimally performing network device as not performing sub-optimally due to the performance issue with the Wide Area Network to which the particular sub-optimally performing network device belongs.

11. The apparatus of claim 9, wherein the one or more processors are further configured to:
classify the subnetwork of network devices as performing sub-optimally based on one or more uplinks of the network devices in the subnetwork; or
classify the geographic cluster of network devices as performing sub-optimally based on one or more uplinks of the network devices in the geographic cluster.

12. The apparatus of claim 9, wherein the one or more processors are further configured to:
classify the subnetwork of network devices as performing sub-optimally based on a number of operators of the network devices in the subnetwork; or
classify the geographic cluster of network devices as performing sub-optimally based on a number of operators of the network devices in the geographic cluster.

13. The apparatus of claim 9, wherein the one or more processors are further configured to:
classify the subnetwork of network devices as performing sub-optimally based on an expected number of sub-optimally performing network devices in the subnetwork; or
classify the geographic cluster of network devices as performing sub-optimally based on an expected number of sub-optimally performing network devices in the geographic cluster.

14. The apparatus of claim 9, wherein the one or more processors are further configured to:
calculate a second degree of confidence for which the subnetwork of network devices is performing sub-optimally;
calculate a third degree of confidence for which the geographic cluster of network devices is performing sub-optimally; and
calculate the first degree of confidence based on the second degree of confidence and the third degree of confidence.

15. One or more non-transitory computer readable storage media encoded with instructions that, when executed by a processor, cause the processor to:
classify a subnetwork of network devices as performing sub-optimally;
classify a geographic cluster of network devices as performing sub-optimally;
determine whether a particular sub-optimally performing network device is in both the subnetwork and the geographic cluster;
if it is determined that the particular sub-optimally performing network device is in both the subnetwork and the geographic cluster, identify the particular sub-optimally performing network device as performing sub-optimally due to a performance issue with a Wide Area Network to which the particular sub-optimally performing network device belongs, wherein the Wide Area Network includes a plurality of subnetworks including the subnetwork, and wherein the subnetwork includes a set of Internet Protocol addresses; and
calculate a first degree of confidence for which the particular sub-optimally performing network device is performing sub-optimally due to the performance issue with the Wide Area Network.

16. The one or more non-transitory computer readable storage media of claim 15, wherein the instructions further cause the processor to:
classify the subnetwork of network devices as performing sub-optimally based on one or more uplinks of the network devices in the subnetwork; or
classify the geographic cluster of network devices as performing sub-optimally based on one or more uplinks of the network devices in the geographic cluster.

17. The one or more non-transitory computer readable storage media of claim 15, wherein the instructions further cause the processor to:
classify the subnetwork of network devices as performing sub-optimally based on a number of operators of the network devices in the subnetwork; or
classify the geographic cluster of network devices as performing sub-optimally based on a number of operators of the network devices in the geographic cluster.

18. The one or more non-transitory computer readable storage media of claim 15, wherein the instructions further cause the processor to:
classify the subnetwork of network devices as performing sub-optimally based on an expected number of sub-optimally performing network devices in the subnetwork; or
classify the geographic cluster of network devices as performing sub-optimally based on an expected number of sub-optimally performing network devices in the geographic cluster.

19. The one or more non-transitory computer readable storage media of claim 15, wherein the instructions further cause the processor to:
if it is determined that the particular sub-optimally performing network device is not in both the subnetwork and the geographic cluster, identify the particular sub-optimally performing network device as not performing sub-optimally due to the performance issue with the Wide Area Network to which the particular sub-optimally performing network device belongs.

20. The one or more non-transitory computer readable storage media of claim 15, wherein the instructions further cause the processor to:
calculate a second degree of confidence for which the subnetwork of network devices is performing sub-optimally;

calculate a third degree of confidence for which the geographic cluster of network devices is performing sub-optimally; and calculate the first degree of confidence based on the second degree of confidence and the third degree of confidence.

* * * * *